United States Patent [19]
Kouzu et al.

[11] Patent Number: 6,111,387
[45] Date of Patent: Aug. 29, 2000

[54] END PLATE INCORPORATED IN BATTERY POWER SOURCE UNIT, AND COOLING DEVICE FOR SAME

[75] Inventors: Katsumi Kouzu, Sanda; Takaki Kobayashi; Shuuhei Marukawa, both of Toyohashi; Toyohiko Etoh, Toyota; Koh Watanabe, Toyohashi; Yasuyoshi Fukao, Toyota; Manabu Kakino, Uji; Kiwamu Inui, Toyohashi; Kunio Kanamaru, Okazaki, all of Japan

[73] Assignees: Matsushita Electric Industrial Co., Ltd., Osaka; Toyota Jidosha Kabushiki Kaisha, Aichi-ken, both of Japan

[21] Appl. No.: 09/046,416

[22] Filed: Mar. 23, 1998

[30] Foreign Application Priority Data

Mar. 24, 1997 [JP] Japan .................................. 9-069956
Mar. 24, 1997 [JP] Japan .................................. 9-069957

[51] Int. Cl.[7] ...................................................... H02J 7/00
[52] U.S. Cl. .............................................. 320/107; 429/99
[58] Field of Search .............................. 320/107; 429/96, 429/97, 99, 100, 120

[56] References Cited

U.S. PATENT DOCUMENTS

| 5,015,545 | 5/1991 | Brooks | 429/99 |
|---|---|---|---|
| 5,187,031 | 2/1993 | Heiman et al. | 429/129 |
| 5,204,609 | 4/1993 | Alisauski | 320/107 |
| 5,578,392 | 11/1996 | Kawamura | 429/99 |
| 5,585,204 | 12/1996 | Oshida et al. | 429/62 |
| 5,756,227 | 5/1998 | Suzuki et al. | 429/62 |
| 5,866,276 | 2/1999 | Ogami et al. | 429/120 |

FOREIGN PATENT DOCUMENTS

| 568339 | 4/1993 | European Pat. Off. . |
| 716460 | 11/1995 | European Pat. Off. . |
| 1267153 | 12/1958 | France . |
| 4326943 | 8/1993 | Germany . |
| 2027978 | 8/1979 | United Kingdom . |
| 2206726 | 6/1988 | United Kingdom . |
| 2267992 | 5/1993 | United Kingdom . |

*Primary Examiner*—Peter S. Wong
*Assistant Examiner*—Lawrence Luk
*Attorney, Agent, or Firm*—Price, Gess & Ubell

[57] ABSTRACT

Battery power source device wherein a large number of battery modules (9) consisting of a row of a plurality of single cells (7) connected electrically and mechanically in series are arranged parallel to each other and held in a holder casing (10), bus bars (28) being provided that effect electrical connection between the terminals of battery modules (9) at respective end plates (19), (20) positioned at both ends of this holder casing (10) wherein the end plates (19), (20) are constituted of resin plates and the bus bars (28) are fixed to the end plates (19), (20) by insertion molding.

21 Claims, 16 Drawing Sheets

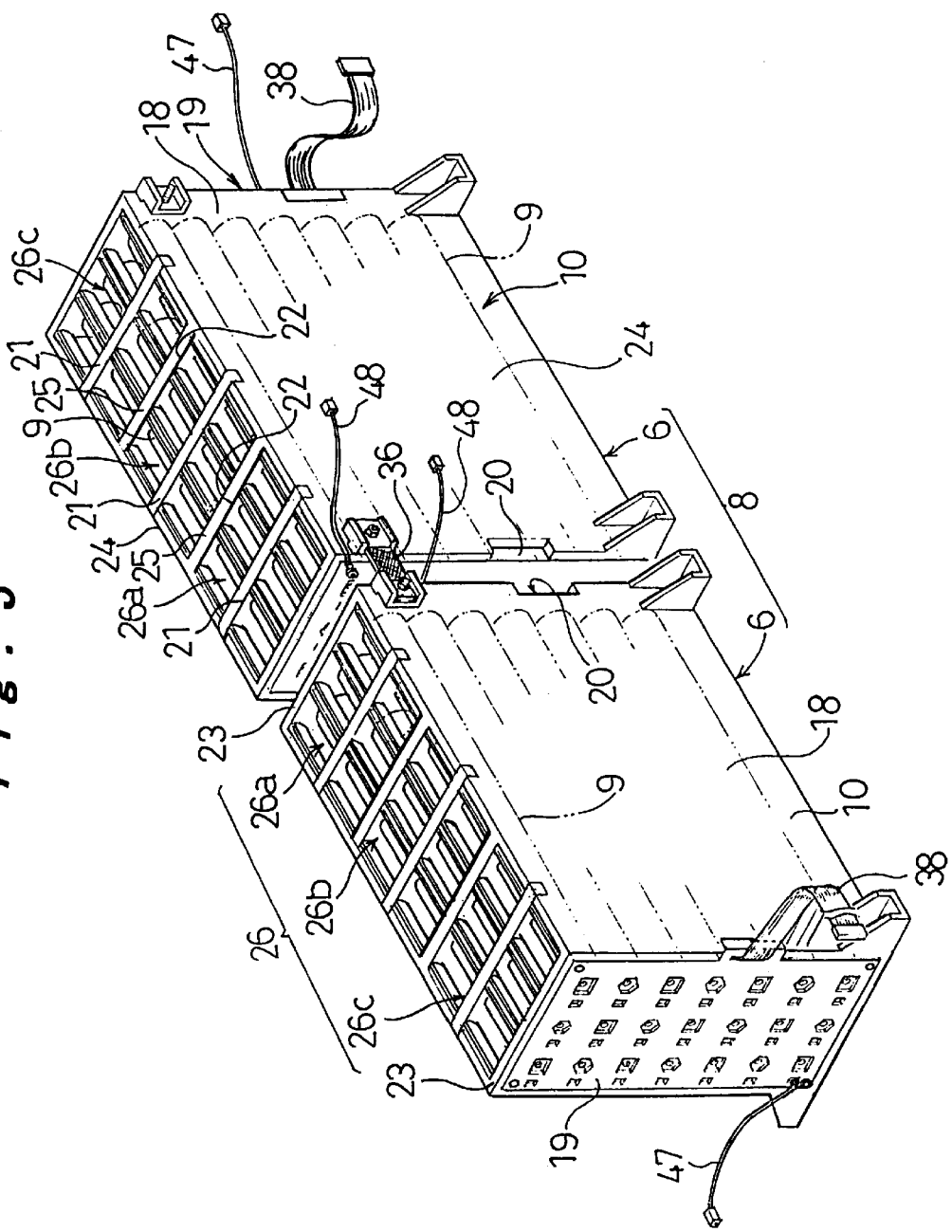

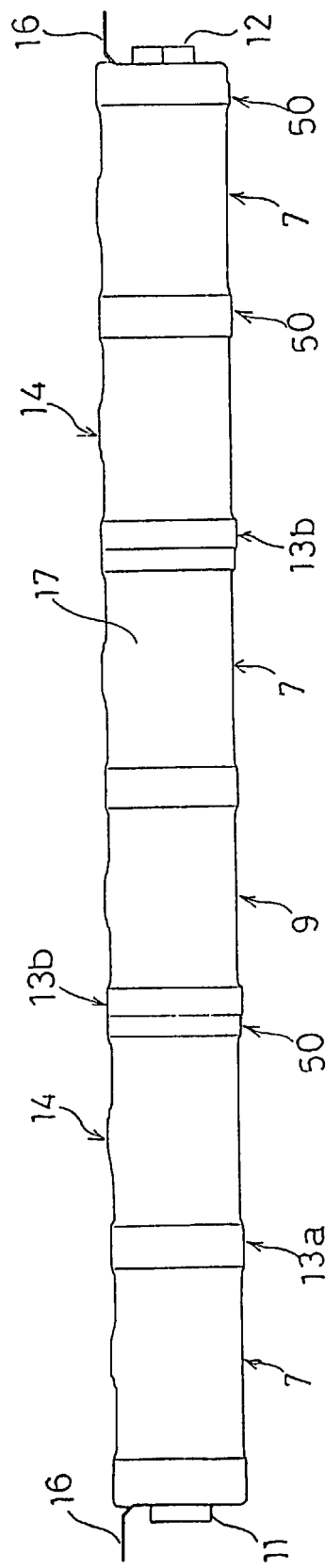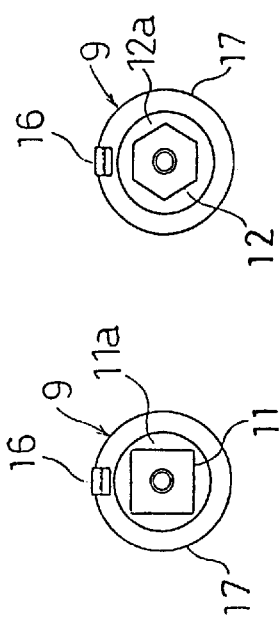
Fig. 4A　Fig. 4B　Fig. 4C

END PLATE INCORPORATED IN BATTERY POWER SOURCE UNIT, AND COOLING DEVICE FOR SAME

BACKGROUND OF THE INVENTION

1. Technical Field of the Invention

The present invention relates to an end plate employed in a battery power source device used as a motor drive source or the like for an electrically powered automobile, and to a cooling device that cools this battery power source device by air cooling.

2. Description of Related Art

In a known type of battery power source of this kind, a large number of battery modules constituted by connecting electrically and mechanically in series a row consisting of a plurality of single cells are arranged in parallel and held in a holder casing. High voltage power is extracted by connecting these battery modules electrically in series.

The present inventors developed a battery power source device wherein a large number of battery modules are arranged in parallel in a holder casing comprising a main casing body and two end plates, series electrical connection between the battery modules being achieved by holding ends of the battery modules in holding apertures provided in the end plates and locking the ends of the battery modules to a metal bus bar arranged on the outside face of the end plates.

However, with this prior example, since the end plates and bus bar were separate, there were the problems that deficiencies occurred in regard to the holding strength and rigidity of the battery modules and the operation of assembling the battery modules in the holder casing was complicated. There was also the problem of wrong insertion if the plus electrode and minus electrode of the battery modules were wrongly assembled in the holder casing and the problem of twisting between the single cells being produced on locking the battery modules to the bus bar.

Also, in a battery power source unit as described above, there was the serious problem of how to restrain the rise in temperature produced by evolution of heat from the battery modules tightly packed in the holder casing.

Furthermore, since nickel-hydrogen secondary cells were employed as the cells of a battery power source device of this type, and, under abnormal conditions, leakage of hydrogen from the cell cans may occur, safe measures for dealing with such hydrogen leakage posed a serious challenge.

Also, an arrangement is known in which high voltage power is supplied in an electrically powered automobile by mounting therein battery power source assemblies comprising a pair of battery power source devices electrically connected in series. However, in this case, efficient cooling of the battery power source devices presented a serious problem.

In order to suppress rising temperature brought about by evolution of heat from the batteries in the above battery power source device, the inventors modified the design of the holder casing and developed a cooling device having an air flow guide such as to make a suitable amount of cooling air flow along the battery modules.

However, with this prior example, not only was it difficult to suitably distribute the flow of air in regard to the battery modules but also it was difficult to effect uniform cooling between the single cells connected in series to constitute the individual battery modules. Specifically, the air flowing along the battery modules rises in temperature due to the heat received from the single cells whilst it is flowing from the upstream side to the downstream side, causing its cooling effect to gradually diminish. Thus it was extremely difficult to compensate for this by individually controlling the air flow rate and air flow speed for each individual battery module in order to achieve uniform cooling of the individual unit cells from the upstream side to the downstream side.

BRIEF SUMMARY OF THE INVENTION

A main object of the present invention is therefore to provide a battery power source device and end plates used therein whereby the above problems of the prior examples are eliminated and voltage detection of the battery modules and/or detection of abnormal temperature rise of the single cells can be performed in a convenient manner with a simple construction.

Further, an object of the present invention is to solve the problems of the prior examples and to provide safety measures in respect of hydrogen leakage and a cooling device of a comparatively simple structure whereby cooling of a battery power source assembly comprising a pair of battery power source devices can be achieved in an efficient manner.

In order to solve the above problems, the present invention consists in a battery power source device wherein a large number of battery modules consisting of a row of a plurality of single cells connected electrically and mechanically in series are arranged parallel to each other and held in a holder casing, bus bars being provided that effect electrical connection between the terminals of battery modules at respective end plates positioned at both ends of this holder casing wherein the end plates are constituted of resin plates and the bus bars are fixed to the end plates by insertion molding.

Thanks to the above construction, with a battery power source device according to the present invention, since the bus bars are integrally assembled in the end plates, the supporting strength and rigidity of the battery modules can be greatly increased and the battery modules can be coupled to the bus bars merely by the operation of locking the bolts etc. As a result, the operation of assembling the battery modules with the holder casing can be performed simply and easily.

Conveniently, according to the invention, the single cells are nickel-hydrogen secondary cells, and all of the battery modules that are arranged in the holder casing are, as a whole, electrically connected in series by being alternately connected by a bus bar of one end plate and a bus bar of the other end plate, and, furthermore, the battery modules are held in the holder casing arranged horizontally in matrix fashion on respective vertical and transverse straight lines.

In a battery power source device according to the invention, a construction may be adopted whereby leads for measuring the voltages across the terminals of single ones or a plurality of battery modules are embedded by insertion molding in an end plate, and fuses are arranged on the leads for measuring the voltages across the terminals, the fuses being mounted on fuse mounting elements fixed by insertion molding in an end plate, and the leads are collected at a single location and are extracted from the end plate to the outside; further, of the two end plates, the leads are embedded by insertion molding in only one end plate, each lead being connected to each bus bar, it being thereby arranged that the voltage of the terminals of two battery modules can be measured.

By means of such a construction, a voltage detection device for battery modules can be provided that is of straightforward construction and in which the leads for measuring the voltages across the terminals of single ones or a plurality of battery modules are incorporated in the end plates and are therefore convenient to handle and there is no possibility of mis-wiring. Furthermore safety in respect of short-circuiting can be improved by means of the fuses.

In a battery power source device according to the present invention, a construction may be adopted whereby temperature sensors whose electrical resistance increases abruptly on rise in temperature of the single cells are mounted from outside, these temperature sensors being connected in series, whereby abnormal rise in temperature is detected in at least battery module units; also, holding elements that hold the ends of connecting wires that connect the temperature sensors in series are fixed in an end plate by insertion molding; abnormality of temperature rise is detected in units of a plurality of battery modules by providing connecting wires at units of battery modules and electrically connecting in series holding elements that hold the ends of these; connecting elements that effect series electrical connection between holding elements are fixed to an end plate by insertion molding; and furthermore, abnormality of temperature rise is detected by mounting from the outside temperature sensors whose electrical resistance increases abruptly on rise in temperature on all the single cells arranged in the holder casing, all these temperature sensors being connected in series.

By adopting such a construction, abnormal rise in temperature of single cells can be detected in at least battery module units and, if required, abnormal rise in temperature of all the single cells belonging to a battery power source device can be detected by a straightforward construction having only two leads extracted externally. Furthermore, by constructing holding elements and connecting elements that connect the holding elements integrally with an end plate, the construction operation can be simplified and the task of connection made easier. In a battery power source device according to the present invention, a construction may be adopted wherein a non-circular nut member constituting a plus electrode is provided at one end of a battery module and a non-circular nut member constituting a minus electrode is provided at the other end, respectively, the battery module being fixed to a bus bar of both end plates by locking screw members screwed through through-holes provided in bus bars into these nut members; the external shape of the nut member constituting the plus electrode and the external shape of the nut member constituting the minus electrode are different such that when the two shapes are superposed, neither is fully included within the other; and a holding recess of a shape corresponding to the external shape of the nut member is provided in an end plate, the nut member being fitted into and held in this holding recess; and furthermore the shape of the holding recess into which is fitted and held the nut member constituting the plus electrode and wherein the shape of the holding recess into which is fitted and held the nut member constituting the minus electrode are different.

By adopting this construction, the battery modules can be fixed in a straightforward manner by locking the screw members, and the screw members are locked by holding the nut members of non-circular shape in the holding recesses in which these fit. This thereby makes it possible to prevent conjoint rotation of the battery modules on locking so the locking operation can be carried out without difficulty and twisting between the single cells can be prevented from occurring. Furthermore, due to the shape of the nut members constituting the plus electrodes and the holding recesses corresponding thereto being different from the shape of the nut members constituting the minus electrodes and the holding recesses corresponding thereto, the problems of battery modules being wrongly inserted can be solved.

In a battery power source device according to the present invention, a construction may be adopted wherein one of the end plates of the holder casing is fixed to the main body of the holder casing while the other end plate is held in the main body of the holder casing movably in the longitudinal direction of the battery module.

By means of such a construction, even if the relative positions of the holder casing and battery modules changes due to differences in thermal expansion coefficient, holding of the battery modules can always be reliably achieved.

In a battery power source device according to the present invention, a construction may be adopted wherein the holder casing comprises a battery module support plate parallel to the two end plates, through-holes into which the battery modules are freely inserted being provided in the battery module support plate, an anti-vibration sheet integrally provided with anti-vibration rings corresponding to the insertion holes being assembled such that, by pressing the anti-vibration rings into the insertion holes in the battery module support plate they are made to extend along these, so that suitable intermediate locations along the longitudinal direction of the battery modules are supported in the battery module support plate in a condition inserted into the anti-vibration rings; and a battery module comprises an insulating ring at a joint between single cells, the insulating ring at the location where insertion is effected into an anti-vibration ring therein being of larger external diameter than another insulating ring; and furthermore the battery module support plate is constituted by a partition that partitions the battery module arrangement space within the holder casing and this partition is integrally formed with the holder casing.

By means of this construction, an anti-vibration construction that protects the battery modules from external vibration can be achieved in a straightforward manner.

According to the present invention, a battery power source assembly construction may be adopted comprising a plurality of battery power source devices as above, electrical series connection being effected between the battery power source devices; and wherein, in these battery power source devices, the connection cable whereby the battery power source devices are connected in series is flexible.

With a battery power source assembly as described above, high voltage power can be extracted and the assembly is suited to use as a motor drive power source for an electric automobile, and, thanks to the connection between the power source devices being achieved by a flexible connecting cable, even if the positional relationship of two battery power source devices changes, reliable connection between the two can still be achieved. In order to solve the above problems, the present invention provides an end plate employed in a battery power source device in which a large number of battery modules constituted by connecting a plurality of single cells electrically and mechanically in series in a row are arranged parallel to each other and held in a holder casing, bus bars being provided in end plates arranged at both ends of this holder casing whereby electrical connection is effected between the terminals of the battery modules, this end plate being constituted by a resin plate, the bus bars being fixed by embedding in the resin plate by insertion molding, holding recesses in which ends of battery modules are inserted and held being formed in one face of the resin plate such that portions of bus bars whereby the ends of battery modules are connected are exposed, and being formed such that portions of bus bars in the other face of the resin plate where contact is effected by the screw members where locking recesses lock the ends of the battery modules are exposed.

Thanks to the above construction, with an end plate according to the present invention, the support strength and rigidity of the battery modules can be greatly improved and the task of assembly of the battery modules in the holder casing can be made straightforward and easy.

In an end plate according to the present invention, a construction may be adopted wherein the shape of the holding recess which fits and holds the end of the battery module on the side constituting the plus electrode and the shape of the holding recess which fits and holds the end of the battery module on the side constituting the minus electrode are different such that when the two shapes are superposed, neither is fully included within the other; and the holding recess and locking recess are formed to be functionally interchangeable; and furthermore the locking recess that is positioned behind the holding recess that fits and holds the end of a battery module constituting a plus terminal is formed so as to be capable of constituting a holding recess that fits and holds the end of a battery module constituting a minus terminal and the locking recess that is positioned behind the holding recess that fits and holds the end of a battery module constituting a minus terminal is formed so as to be capable of constituting a holding recess that fits and holds the end of a battery module constituting a plus terminal.

Thanks to this construction, an end plate can be provided wherein the problem of battery modules being wrongly inserted can be solved and wherein two battery power source devices can be employed in common in a batter power source assembly comprising a pair of left and right battery power source devices.

Further, in order to solve the above problems, according to the present invention, in a device in which a large number of battery modules constituted by connecting a plurality of single cells in a row electrically and mechanically in series are arranged parallel to each other and held in a holder casing and air is forcibly made to flow in one direction within this holder casing thereby cooling the large number of battery modules in the holder casing the direction of flow of the air is a direction at right angles to the longitudinal direction of the battery modules.

With a battery power source cooling according to the present invention, since the direction of flow of the cooling air is a direction at right angles to the longitudinal direction of the battery modules, mutual cooling of the single cells that constitute the battery modules can easily be performed in a uniform manner without adopting special expedients and countermeasures in respect of the lowering of cooling effect produced by rise in temperature of the air occurring whilst it flows from the upstream to the downstream side can be carried out comparatively easily for the battery power source device as a whole rather than needing to be carried out at the level of individual battery modules, as in the prior art. According to the invention a construction may suitably be adopted wherein the single cells are nickel-hydrogen secondary cells; the battery modules are arranged horizontally and air is made to flow from bottom to top; the battery modules are held in the holder casing arranged horizontally in matrix fashion on respective vertical and transverse straight lines; and furthermore means for forcibly making air flow in one direction is a pressure-feed type fan arranged on the upstream side of the holder casing.

In particular in a battery power source device in which nickel-hydrogen secondary cells are employed, if a pressure-feed type fan is arranged on the upstream side and cooling of the battery modules is effected by causing air to flow forcibly from bottom to top in the holder casing, even if there should happen to be any leakage of hydrogen from the battery modules, delivery of hydrogen to the side of the pressure-feed fan can be reliably prevented and as a result safety in regard to hydrogen leakage can be ensured.

According to the invention a construction may be adopted wherein, in the cooling device for a battery power source means for flow alignment are arranged within the holder casing such that the flow speed of the air flowing through the holder casing is faster on the downstream side than on the upstream side; and furthermore in which, at a location on the downstream side in the holder casing, the flow path area is progressively diminished such that the flow speed of air flowing through the holder casing gradually becomes larger in the direction of flow of the air.

By adopting such a construction, the flow speed of the air flowing from the upstream side to the downstream side can be gradually increased, so that the cooling effect is raised practically in proportion to the square root of the flow speed, so it is possible to compensate for the diminution of cooling effect brought about by the rise in temperature of the air occurring whilst it flows from the upstream side to the downstream side, so that all the battery modules are subjected to practically uniform cooling.

According to the invention a construction may be adopted wherein, in the cooling device for a battery power source means for screening are arranged in the holder casing such that the area of the battery modules that is exposed to the air flowing through the holder casing becomes smaller from the upstream to the downstream side; and furthermore in which means for screening are arranged only at a location on the upstream side within the holder casing, the means for screening being constituted such that the area of the battery modules that is exposed to air flowing through the holder casing gradually becomes larger going in the direction in which the air is flowing.

By means of a such a construction, overcooling of battery modules on the upstream side is prevented and the air flow can be efficiently utilized for cooling of the battery modules of the entire battery power source device and also more air can be brought into contact with the battery modules on the downstream side than with those on the upstream side so the lowering of cooling effect due to rise in temperature of the air occurring between the upstream side and the downstream side can be compensated for, making it possible to achieve practically uniform cooling of all the battery modules.

Thus by combining means for flow alignment and means for screening as described above, uniform cooling of the battery modules of the entire battery power source device can easily be achieved.

According to the invention a construction may be adopted wherein, in a cooling device for a battery power source, the two ends of battery modules are supported in the two end plates of the holder casing, a cooling adjustment fin plate provided with insertion holes in which the battery modules are freely inserted is assembled with the holder casing demountably and parallel with these at an intermediate location between the two end plates, and fins for the means for flow alignment and/or fins for the means for screening are integrally provided on the cooling adjustment fin plate.

By adopting this construction, uniform cooling of the battery modules can be achieved and a cooling device can be provided wherein assembly of a cooling adjustment fin plate on the holder casing can be achieved easily with a straightforward construction.

In order to solve the above problems the present invention provides a cooling device whereby battery modules are cooled comprising a pair of left and right battery power source devices constituted by holding a large number of battery modules consisting of a plurality of single cells connected in a row electrically and mechanically in series arranged horizontally and parallel to each other in a holder casing, respective air supply chambers being formed below these holder casings and wherein air is fed to a lower aperture of the holder casing of the respective battery power source devices through left and right air supply chambers from a pressure-feed fan so that the battery module is cooled by the air current that is discharged from an upper aperture after rising through the holder casings wherein the pressure-feed fan has two blowing ports that supply air in the direction parallel to the end plates into the respective battery power source devices, these blowing ports opening in positions close to a respective one end plate of the battery power source devices, the bottom faces of the air supply chambers being formed with a slope whereby the cross-sectional area of the flow path gradually diminishes from the one end plate side towards the other end plate side.

With the above invention, delivery of air into the left and right battery power source device can be achieved with a single pressure-feed type fan and, due to the provision of the slope, variation of the amount of air that is taken into the holder casing from the air supply chamber depending on the position in the direction from one end plate towards the other end plate in each battery power source device can be prevented.

According to the invention a construction may be adopted wherein, in a cooling device for a battery power source, in the vicinity of the inlet of an air supply chamber, there is provided a flow alignment guide that alters the direction of flow of the incoming air delivered from the blowing port that opens in a position close to one end plate towards the other end plate; and in which, in the vicinity of the inlet of an air supply chamber, there is provided a flow alignment guide that guides the direction of flow of the incoming air delivered from the blowing port upwards; and furthermore in which an air current direction guide is provided that directs upwardly the direction of flow of air at the slope of the bottom face of the air supply chamber and constructed so as to ensure the amount of air flow that is delivered to a location positioned intermediate the two end plates of the holder casing.

By means of this construction, air flowing in from the inlet of an air supply chamber in a position close to one end plate can be guided smoothly to the other end plate by the flow alignment guide and, by the air current direction guide that is provided in the vicinity of the inlet of the air supply chamber, air is prevented from passing straight through and the amount of air that is delivered into the holder casing from a location in the vicinity of the inlet can be guaranteed. Furthermore, since the amount of air that is delivered to a location positioned intermediate the two end plates of the holder casing can be guaranteed by the air current direction guide that is provided on the slope, supply of cooling air within the holder casing can be performed in a uniform manner over the entire region without any possibility of being concentrated at a specific location. As a result, air cooling of the large number of battery modules within the two battery power source devices can be performed uniformly and effectively.

According to the invention a construction may be adopted wherein, in a cooling device for a battery power source, means for flow alignment are arranged within the holder casing whereby the flow rate of the air flowing within the holder casing is faster at the upper than at the lower side; and wherein the flow path area is gradually diminished at a location in the upper part in the holder casing such that the flow speed of air flowing in the holding casing gradually gets larger in the direction in which the air is flowing; and in which means for screening are arranged in the holder casing whereby the area of the battery modules that is exposed to the air flowing through the holder casing is smaller in the upper part than in the lower part; and furthermore wherein means for screening are arranged only in a location of the bottom part in the holder casing, the means for screening being constructed such that the area of the battery modules that is exposed to the air flowing through the holder casing gradually gets larger in the direction of flow of the air.

By means of the above construction, due to the action of the means for flow alignment and means for screening, cooling of the large number of battery modules within the battery power source devices can be performed uniformly and without bias in the vertical direction. As a result, uniform cooling of all the battery modules in the two battery power source devices can be achieved.

BRIEF DESCRIPTION OF THE DRAWINGS

FIG. 3 is a perspective view showing a battery power source assembly;

FIG. 4A is a front view showing a battery module, FIG. 4B is a left side view thereof, and FIG. 4C is a right side view thereof;

DETAILED DESCRIPTION OF PREFERRED EMBODIMENTS

Figure 1:
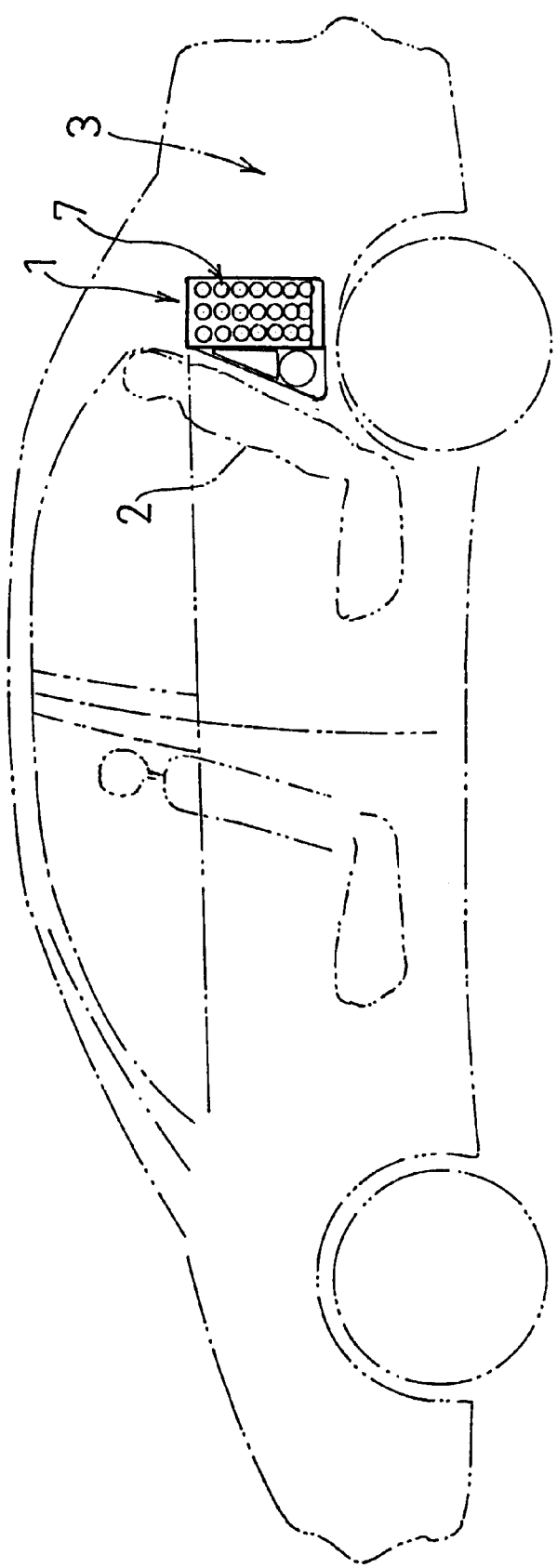
FIG. 1 is a diagrammatic side view showing the relationship between an automobile and a battery pack unit.

FIG. 1 shows a hybrid type automobile whose locomotive drive source is constituted by combining an internal combustion engine and a battery driven motor. In this hybrid type automobile, the internal combustion engine is operated under optimum conditions and when output is insufficient for the running conditions, this output deficiency is made up by the output of the battery driven motor; and by performing regenerative power absorption during deceleration the distance of travel per unit of fuel is enormously increased in comparison with an automobile in which an ordinary internal combustion engine is used on its own.

Figure 2:
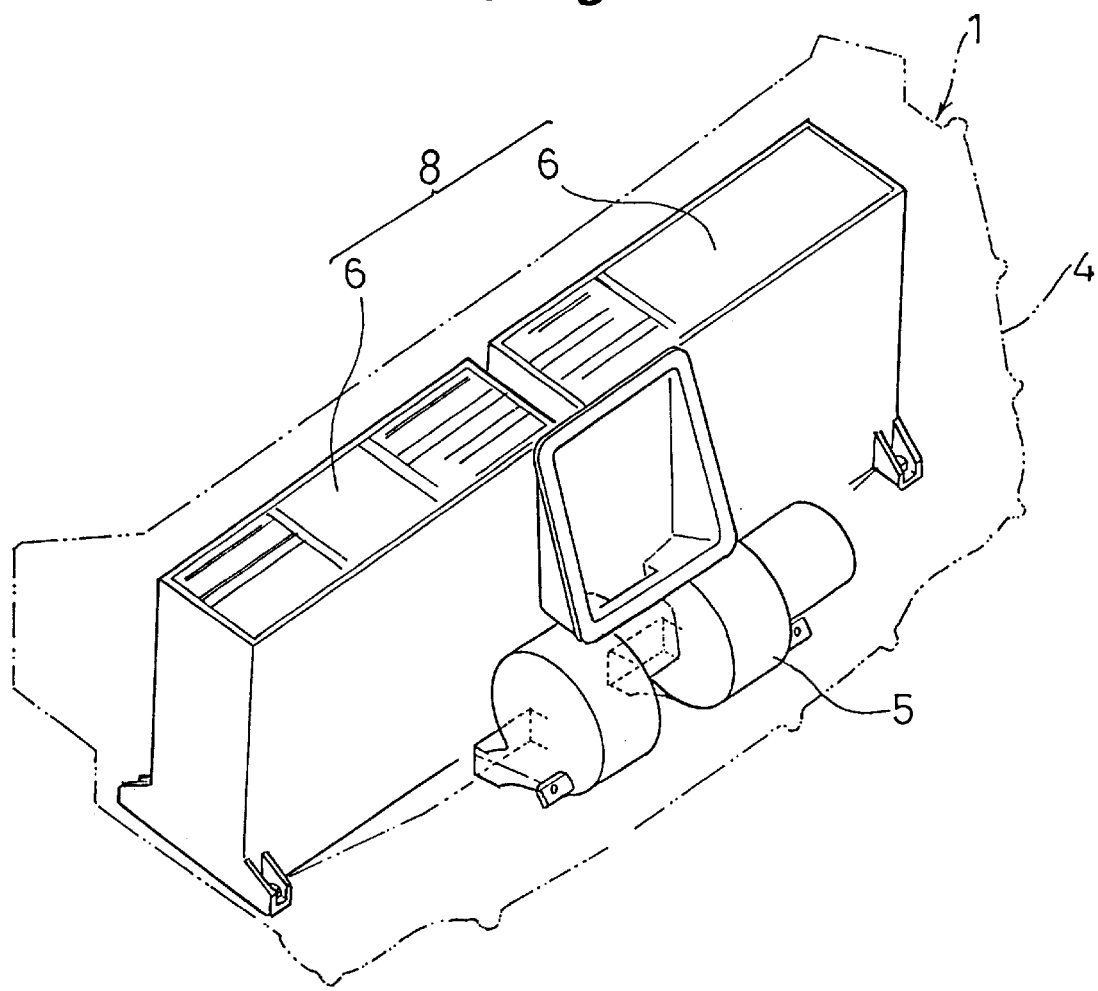
FIG. 2 is a perspective view showing an outline of a battery pack unit.

As the electric power source of the battery driven motor, nickel-hydrogen secondary cells are employed, these being accommodated in a battery pack unit 1 shown in FIG. 1 and FIG. 2. This battery pack unit 1 is arranged in the space between the rear seat 2 and the boot 3 behind it.

Battery pack unit 1 comprises an outside casing 4 consisting of a resin molding, a fan 5 arranged therein, and a pair of left and right battery power source devices 6, 6 arranged within outer casing 4. In each battery power source device 6, there are provided 126 electrically series-connected single cells (also called battery cells) constituted by nickel-hydrogen secondary cell units; this enables power supply of voltage about 125 V. Left and right battery power source devices 6, 6 are identically constructed and are both connected electrically in series to constitute battery power source assembly 8, which is capable of supplying power of voltage about 250 V. Specifically, power of voltage about 250 V is supplied to the battery driven motor.

FIG. 3 shows a battery power source assembly 8 constituted of a left and right pair of battery power source devices 6, 6.

Each battery power source device 6 is constructed by holding within a holder casing 10 a total of 21 battery modules 9 arranged in parallel in three rows transversely and seven rows vertically, each module being constituted by connecting electrically and mechanically in series a row of six single cells 7.

Figure 5:
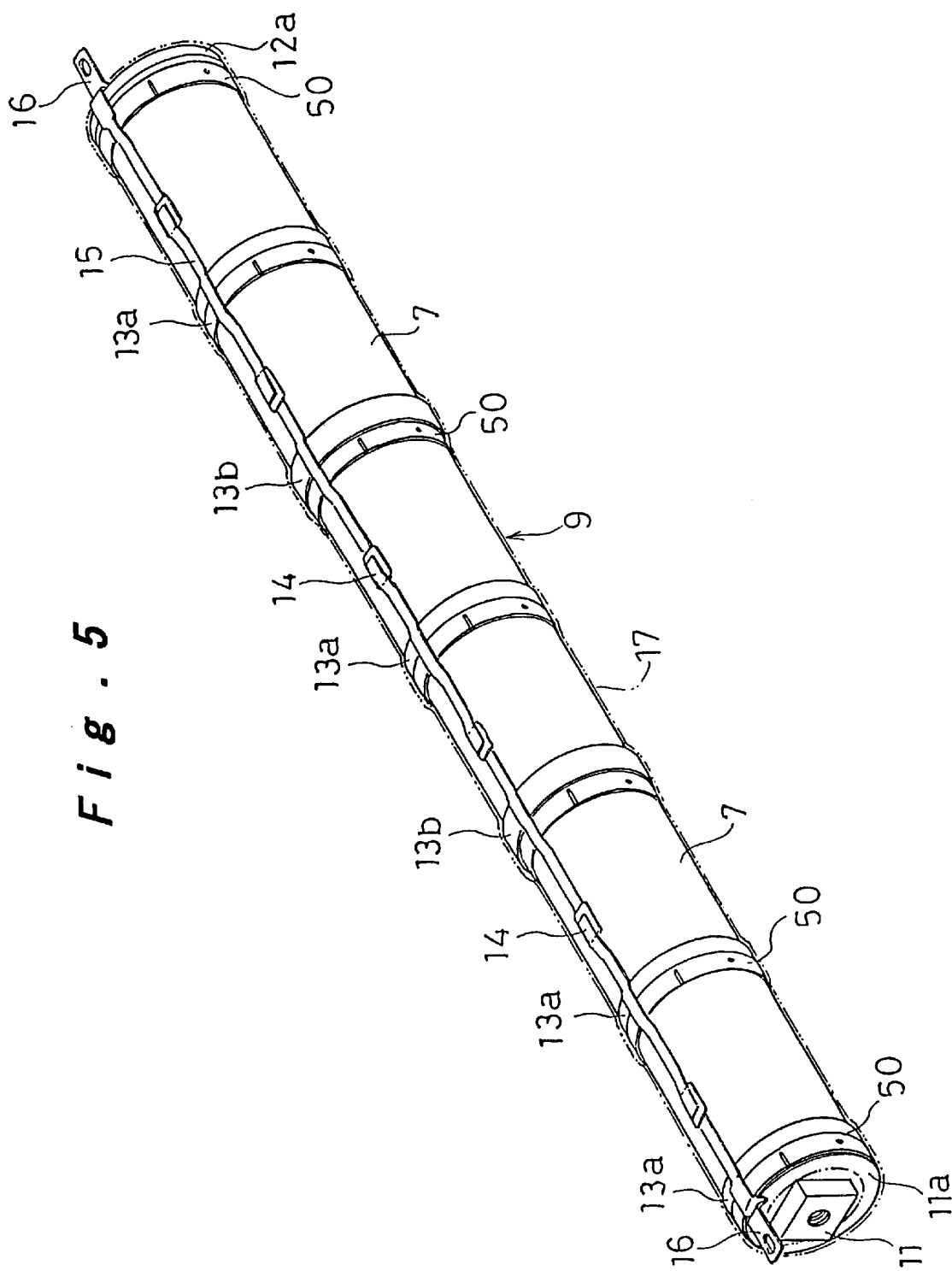
FIG. 5 is a perspective view of a battery module in which an outer tube is shown by an imaginary line.
Figure 6:
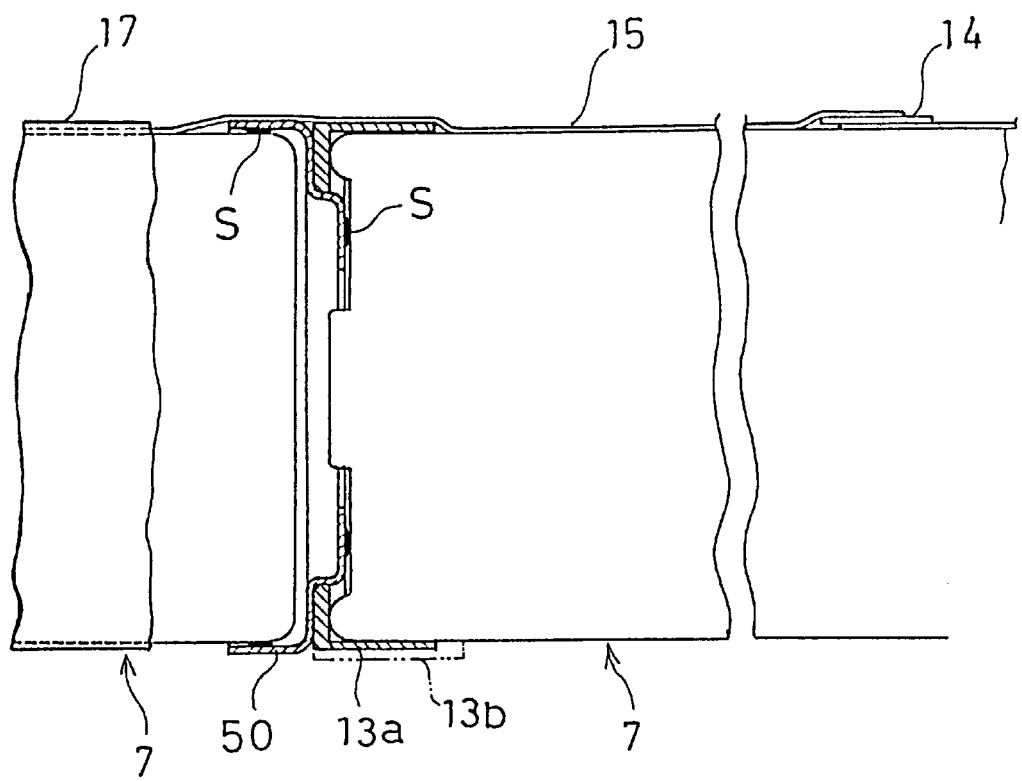
FIG. 6 is a cross-sectional view with part broken away showing major parts of a battery module.

As shown in FIG. 4, FIG. 5 and FIG. 6, in a battery module 9, series connection is effected between single cells 7 using spot welds S, by means of metal connecting rings 50. Also, square nuts 11 provided with seats 11a are connected to single cells 7 at the plus electrode end using spot welding by means of connecting rings 50, at the plus electrode end of battery module 9. Furthermore, hexagonal nuts 12 are connected to single cells 7 at the minus electrode end using spot welding by means of connecting rings 50 at the minus electrode end of battery module 9. The dimension between the opposite sides of square nut 11 and the dimension between the opposite sides of hexagonal nut 12 are made the same so that there is no possibility of these nuts 11 and 12 being inserted in the wrong one of a square holding recess 30a or a hexagonal holding recess 30b, to be described. Insulating rings 13a, 13b made of resin are interposed at the connecting parts in order to prevent short circuiting of the plus electrode and minus electrode in the same single cell. These insulating rings 13a, 13b are made of two types of different external diameter; of the total of six insulating rings 13a, 13b, two of these, indicated by 13b, have the larger external diameter.

A PTC (Positive Temperature Coefficient) sensor 14 is connected to the side circumferential face of each single cell 7. This PTC sensor is a temperature sensor in which abnormality is detected by an abrupt increase of electrical resistance which occurs when the temperature of a single cell 7 rises due to some internal abnormality. For example a sensor may be employed whose electrical resistance rises abruptly when a temperature of 80° C. is reached. A PTC sensor may also be called a "poly sensor". Sensors other than PTC sensors may of course be used for such temperature sensor 14. Six PTC sensors 14 are connected in series by connecting wire 15, and a terminal element 16 consisting of bendable metal plate is mounted at both ends of these. The two terminal elements 16, 16 are arranged so as to project from both ends of battery module 9.

The outer peripheral surface of battery module 9 is covered by means of an outer tube 17 made of resin such as polyvinyl chloride having electrical insulation and heat shrinkage properties. PTC sensor 14 and its connecting wire 15 are protected by single cell 7 and outer tube 17. Square nut 11 constituting the plus electrode, hexagonal nut 12 constituting the minus electrode and the two terminal elements 16, 16 are exposed with respect to outer tube 17.

Figure 7:
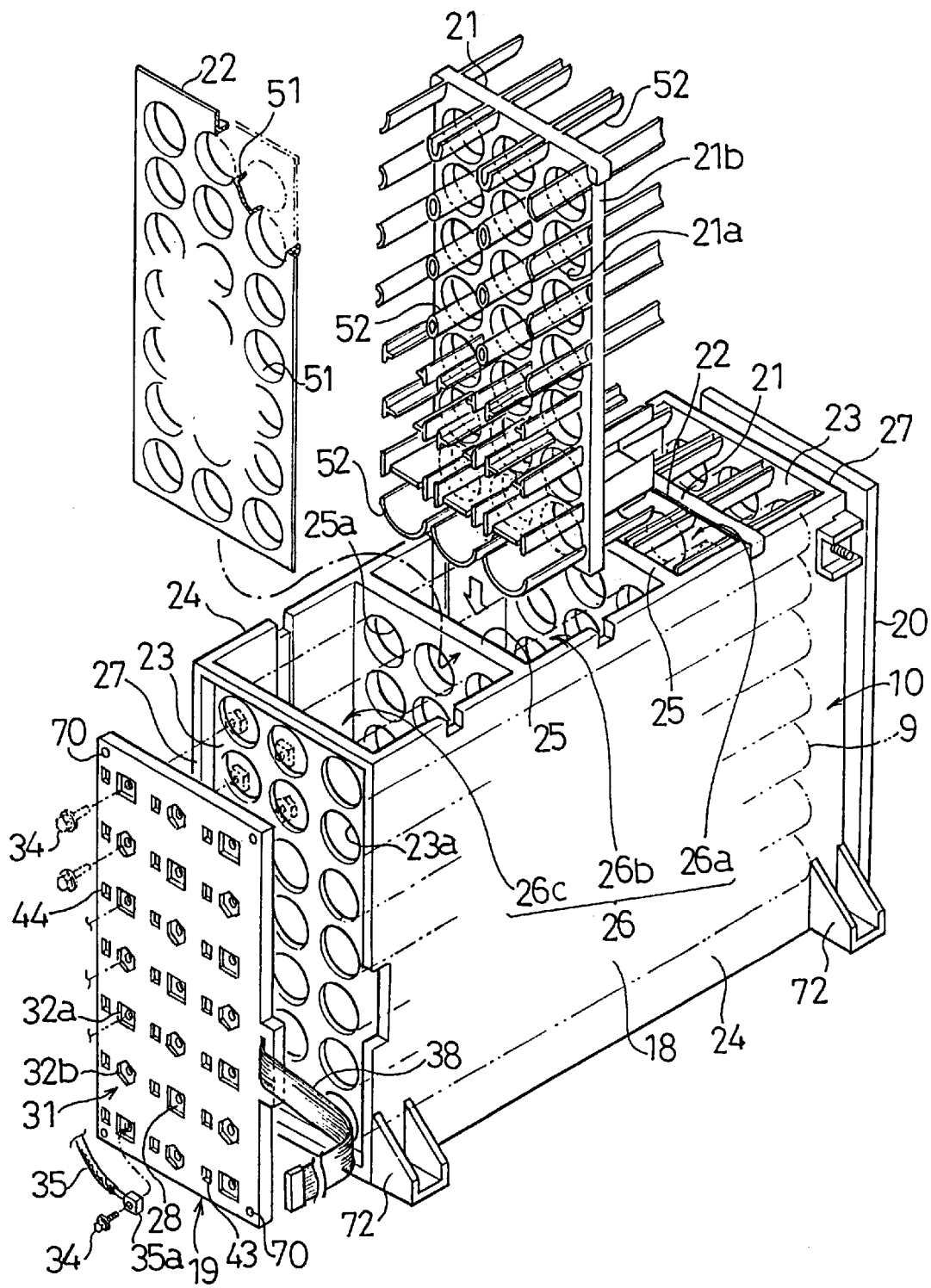
FIG. 7 is an exploded perspective view of a battery power source device.
Figure 8:
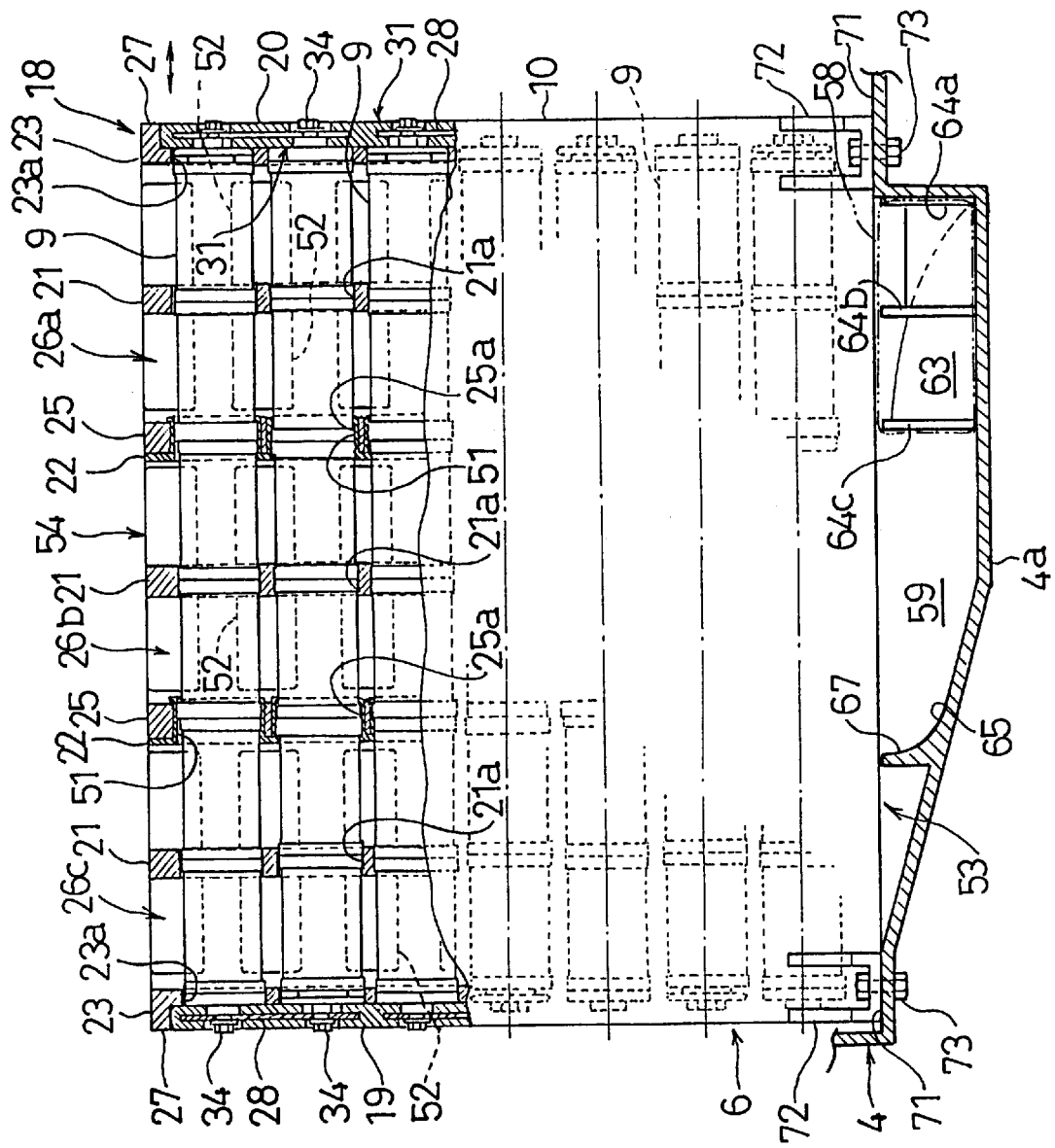
FIG. 8 is a cross-sectional view showing a battery power source device.
Figure 9:
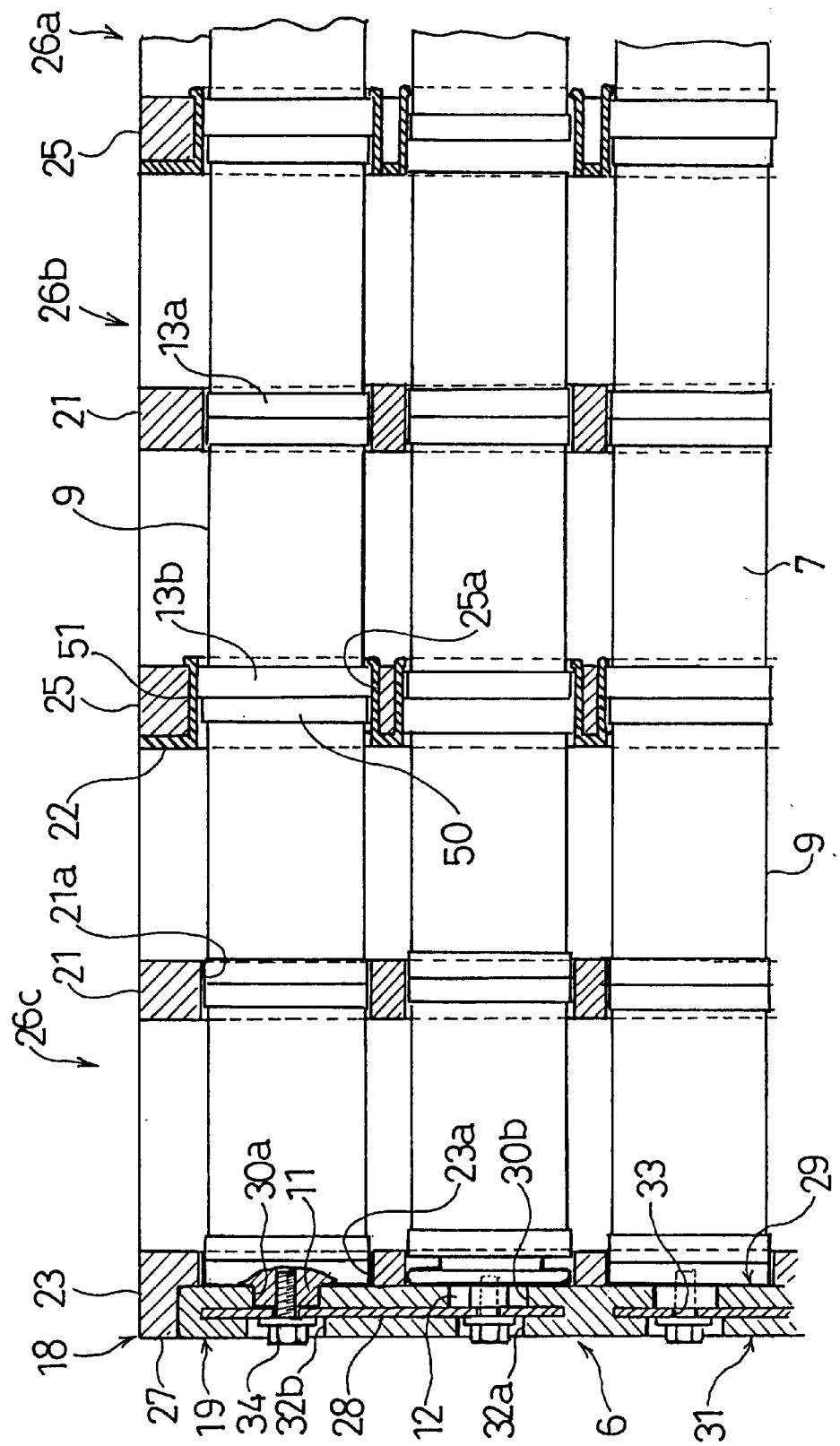
FIG. 9 is a cross-sectional view to a larger scale showing major parts of a battery power source device.

As shown in FIG. 3, FIG. 7 and FIG. 8, holder casing 10 is chiefly constituted by main casing body 18, first end plate 19, second end plate 20, three cooling fin plates 21, 21, 21 and two anti-vibration rubber sheets 22, 22.

Main casing body 18 consists of a unitary resin molding formed in the shape of a cuboidal box whose upper and lower faces are open. The space 26 formed within the two end walls 23, 23 and two side walls 24, 24 constituting four perpendicular walls is practically equally divided into three spaces 26a, 26b, 26c by two partitions 25, 25 parallel to the two end walls 23, 23. Cooling fin plates 21 are inserted from above so as to be positioned in the middle respectively of first partitioned space 26a on the side nearest the second end plate 20, second partitioned space 26b in the middle, and third partitioned space 26c on the side nearest first end plate 19, being arranged parallel to the two end walls 23, 23 and fixed to main casing body 18.

A total of 21 insertion apertures 23a, 25a, 21a in three transverse (horizontal direction) and seven vertical (vertical direction) rows for insertion of battery modules 9 are arranged in the same corresponding positions in end walls 23, 23, partitions 25, 25 and cooling fin plates 21, 21, 21. The insertion apertures 23a, 25a, 21a in the three transverse rows and seven vertical rows are arranged with equal pitch in the transverse and vertical directions and are formed so as to have larger diameter than the external diameter of battery modules 9.

First end plate 19 is screw-fixed to end wall 23 at one end of main casing body 18, by utilising screw holes 70 at its four corners. 27 is a frame part formed at the periphery of end wall 23 of main casing body 18 so as to receive first end plate 19 fitting within it. Second end plate 20 is releasably held on end wall 23 at the other end of main casing body 18. Specifically, second end plate 20 is held fitted in a movable condition on a frame 27 formed at the other end of main casing body 18.

Figure 10:
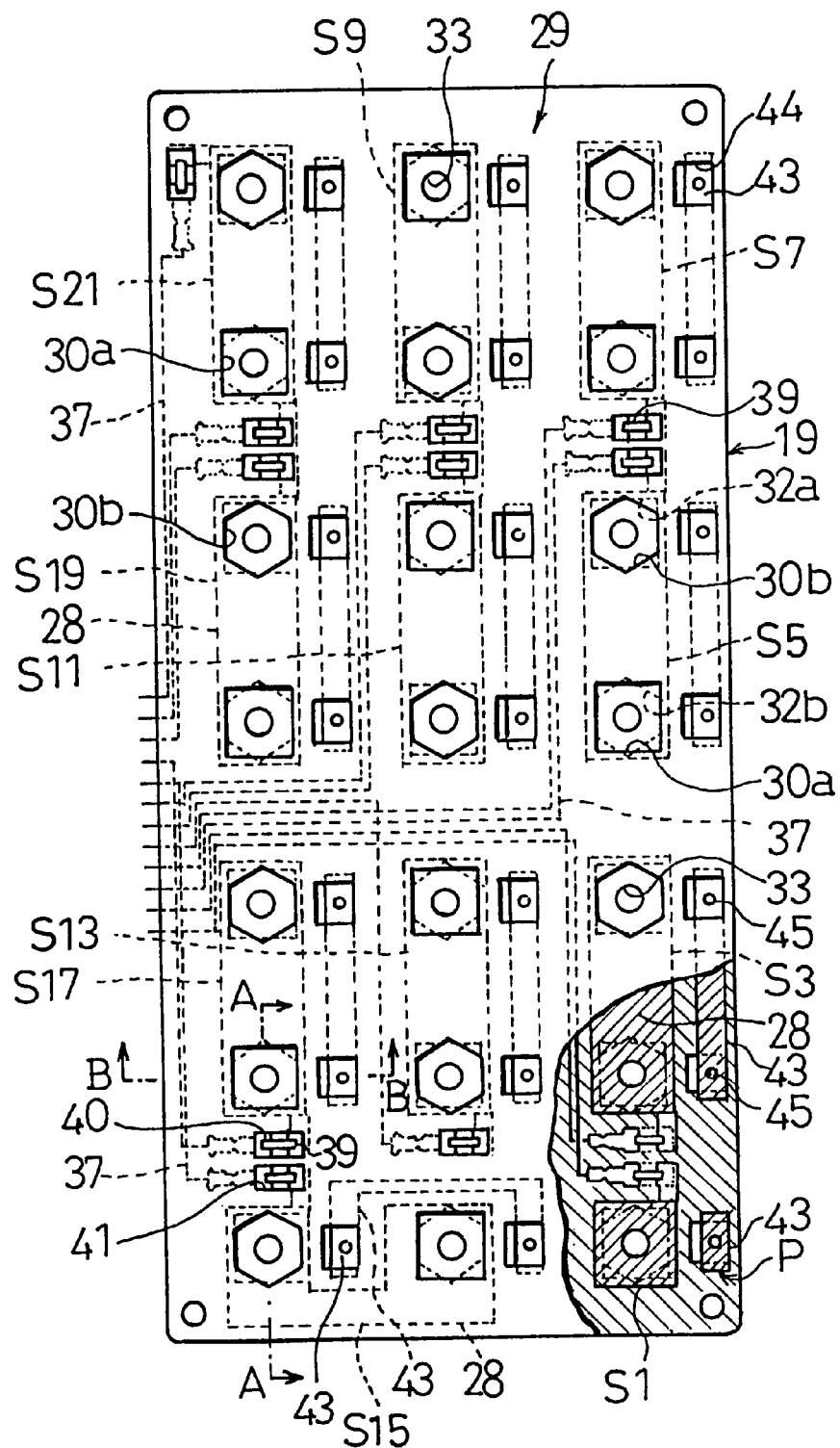
FIG. 10 is a front view of a first end plate seen from the side of the inner surface.

As shown in FIG. 7~FIG. 12, first end plate 19 is constituted by a resin plate and has a bus bar 28 embedded and fixed in this resin plate by insertion molding. On the inside face 29 of the resin plate there are provided square-shaped holding recesses 30a for holding, fitted therein, the square nut 11 constituting the plus electrode terminal of a battery module 9 and hexagonal-shaped holding recesses 30b for holding, fitted therein, the hexagonal nut 12 constituting the minus electrode terminal of a battery module 9. These holding recesses 30a, 30b are provided in corresponding positions to insertion apertures 23a, 25a, 21a and are provided in a total number of 21 in three transverse rows and seven vertical rows. As shown in FIG. 10, the two types of holding recess 30a, 30b are arranged alternately in a relationship such that, of adjacent recesses, one of these is a plus-side square-shaped holding recess 30a while the other is a minus-side hexagonal-shaped holding recess 30b. Holding recesses 30a, 30b are formed of such shape that nuts 11, 12 of the electrode terminals of battery module 9 fit thereinto, so square nut 11 can only be held in square holding recess 30a and the possibility of its being accidentally held in hexagonal holding recess 30b can be forestalled.

A total of 21 locking recesses 32a, 32b are formed in the outside face 31 of first end plate 19 in positions corresponding to holding recesses 30a, 30b. The shapes of these locking recesses 32a, 32b are of two types, namely, square and hexagonal: square locking recesses 32a are of exactly the same shape as square holding recesses 30a described above and hexagonal locking recesses 32b are of exactly the same shape as hexagonal holding recesses 30b described above. As shown in FIG. 10, a hexagonal locking recess 32b is provided behind square holding recess 30a and a square locking recess 32a is provided behind hexagonal holding recess 30b, respectively. The purpose of this construction is to make it possible to use in common respective identical first end plates 19, 19 of a pair of left and right battery power source devices 6, 6 constituting a battery power source assembly 8 as shown in FIG. 3. When a left-side battery power source device 6 is employed, first end plate 19 is assembled into main casing body 18 in a condition as described above but, when a right-side battery power source device 6 is employed, first end plate 19 is assembled into main casing body 18 with recesses corresponding to locking recesses 32a, 32b reversed as between the inside and outside faces so that they are employed as holding recesses 30a, 30b.

Metal bus bars 28 that effect electrical connection between the terminals of battery modules 9 are embedded and fixed by insertion molding such as to be positioned in the middle in the thickness direction of the resin plate of first end plate 19. Bus bars 28 are exposed to the outside at portions surrounded by holding recesses 30a, 30b and locking recesses 32a, 32b.

Through-holes 33 are provided in the middle of such exposed portions.

Nuts 11, 12 at the end of a battery module 9, in a condition in which they are held fitted into holding recesses 30a, 30b, are threaded on to a bolt 34 that is inserted through through-hole 33 from the side of locking recesses 32a, 32b, and by locking bolts 34, nuts 11 and 12 are electrically and mechanically locked to bus bar 28. Since square nut 11 that constitutes the plus electrode of battery module 9 is held fitted into the plus-side square holding recess 30a without any possibility of confusion, the plus electrode of battery module 9 is reliably connected to the plus portion of bus bar 28. Likewise, hexagonal nut 12 constituting the minus electrode of battery module 9 is held fitted in, without any possibility of confusion, in the minus-side hexagonal holding recess 30b, so the minus electrode of battery module 9 is reliably connected to the minus portion of a bus bar 28. Also, since nuts 11 and 12 are prevented from rotation by holding recesses 30a, 30b, the locking operation by means of bolt 34 can proceed smoothly.

Figure 13:
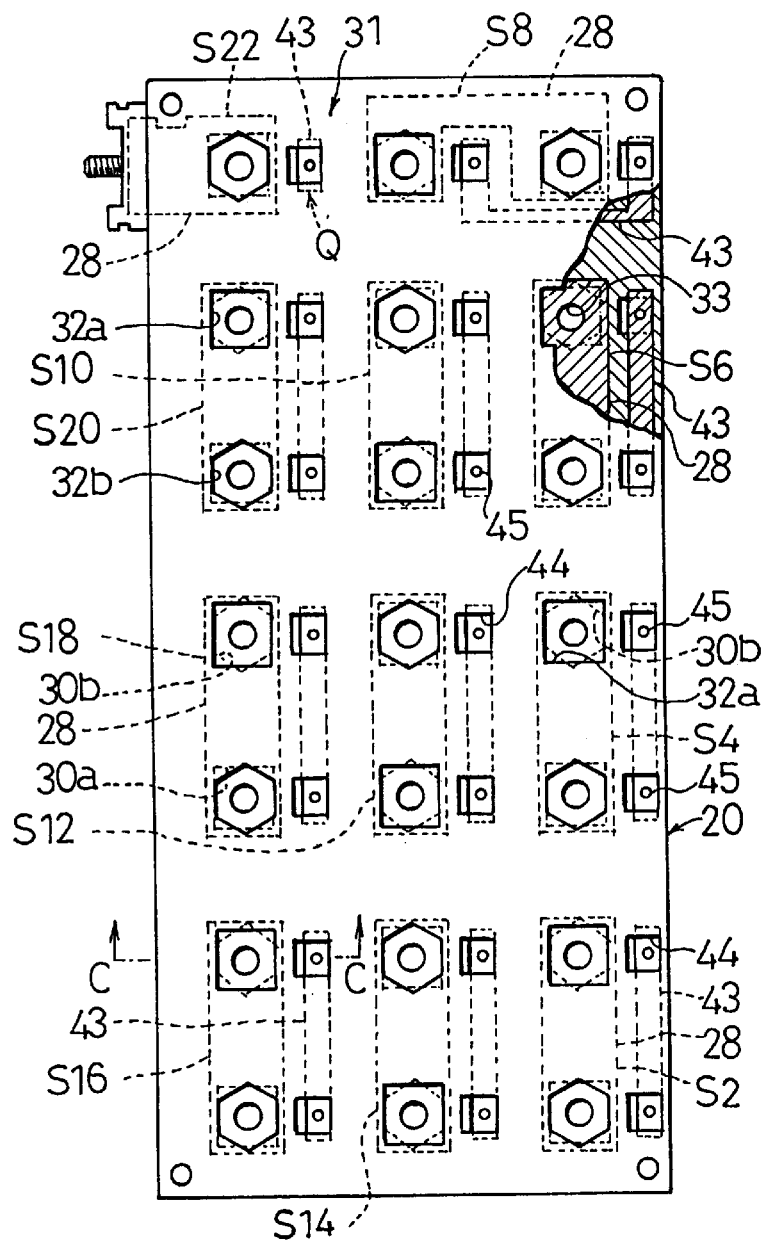
FIG. 13 is a front view of a second end plate seen from the side of the outer surface.
Figure 14:
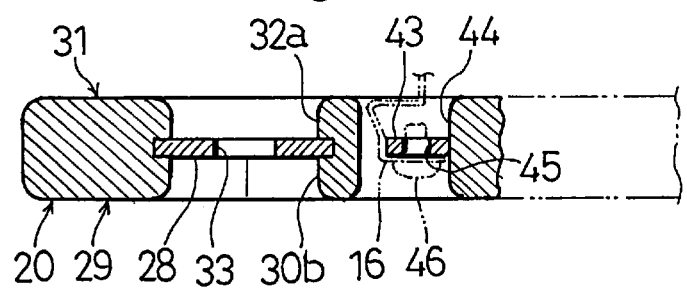
FIG. 14 is a cross-sectional view to a larger scale along the line C—C of FIG. 13.

As shown in FIG. 8, FIG. 13 and FIG. 14, like first end plate 19, second end plate 20 is constituted of a resin plate and a bus bar 28 is embedded and fixed in the resin plate by insertion molding. Its inside face 29 is provided with holding recesses 30a, 30b while its outside face 31 is provided with locking recesses 32a, 32b. Just as in the case of first end plate 19, nuts 11, 12 at the ends of battery modules 9 are electrically and mechanically locked to bus bar 28 by means of bolts 34. Hexagonal holding recesses 30b of second end plate 20 are of course arranged in locations facing square holding recesses 30a of first end plate 19, while square holding recesses 30a of second end plate 20 are arranged in locations facing hexagonal holding recesses 30b of first end plate 19.

Figure 15:
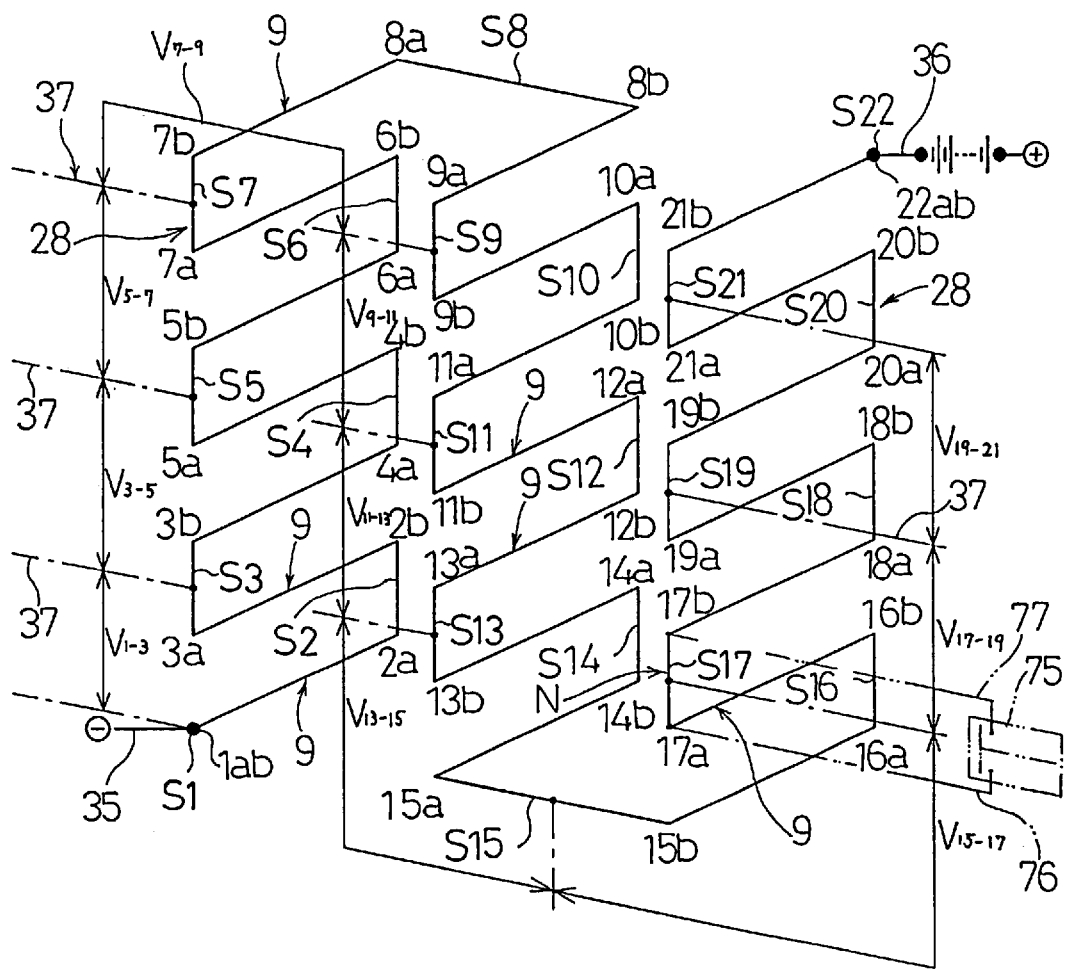
FIG. 15 is a diagram showing how a battery module is connected.

The 21 battery modules 9 which are arranged in parallel in battery power source devices 6 are electrically connected in series by means of bus bars 28 of first end plate 19 and bus bars 28 of second end plate 20. The bus bars 28 embedded and fixed in first end plate 19 are eleven in number, and are indicated in FIG. 10 by S1, S3, S5, S7, S9, S11, S13, S15, S17, S19, and S21. The bus bars 28 that are embedded in fixed in second end plate 20 are eleven in number are indicated in FIG. 13 by S2, S4, S6, S8, S10, S12, S14, S16, S18, S20, and S22. The connection relationship of these with battery modules 9 is shown in FIG. 15.

Strictly speaking, the bus bars indicated by S1 and S22 should be called a minus terminal bar in the case of the former or a plus terminal bar in the case of the latter, rather than bus bars. Although this is not included in the concept of a bus bar according to the present invention, for convenience in description of this embodiment, they are called bus bars and will be described below. The bus bars indicated by S2~S21 have a contact with the plus electrode and a contact with the minus electrode of the battery modules 9 that are electrically adjacent in series; thus these adjacent battery modules 9 are electrically connected in series. For example as shown in FIG. 15, the bus bar indicated by S2 is provided with a plus electrode contact 2a and a minus electrode contact 2b, while the bus bar indicated by S21 is equipped with a plus electrode contact 21a and minus electrode contact 21b. The contact indicated by lab in FIG. 15 is the minus terminal for the entire battery power source assembly 8. To this is connected connecting end ring 35a (see FIG. 7) of motive power cable 35 connected to the battery driven motor. Also, the contact indicated by 22ab in FIG. 15 is the plus terminal of one of the battery power source devices 6. To this is connected the connecting end of a connection cable 36 (see FIG. 3) connected to the minus terminal of the other battery power source device 6. The voltage between the two contacts 1ab and 22ab is about 125 V. Connecting cable 36 has flexibility so that electrical connection between the two battery power source devices 6, 6 can be reliably performed even if there is movement of second end plate 20 due to thermal expansion/contraction of battery modules 9.

As shown in FIG. 7, FIG. 10, FIG. 12 and FIG. 15, in first end plate 19, leads 37 for measurement of the voltage between the terminals of the units of the two battery modules 9, 9 are embedded in a resin plate by insertion molding. As shown by the single-dotted chain lines in FIG. 15, leads 37 are respectively connected to bus bars 28 indicated by S1, S3, S5, S7, S9, S11, S13, S15, S17, S19, and S21 such that the voltage $V_{1-3}$ between bus bars S1 and S3 for example or the voltage $V_{19-21}$ between bus bars S19 and S21 can be measured. Voltage $V_{1-3}$ indicates the voltage between the two battery modules 9, 9 that are electrically connected in series between bus bar S1 and bus bar S3, in other words the voltage across the twelve single cells 7 while the voltages $V_{3-5}, V_{5-7}, \ldots, V_{19-21}$ shown in FIG. 15 likewise indicate the voltage between the two battery modules 9, 9. By measuring these voltages, if any abnormality is detected, some abnormality will be generated in at least one of the twelve single cells 7 belonging to the corresponding two battery modules 9, 9, so countermeasures can be restricted to a comparatively narrow region.

Leads 37 are arranged as shown in FIG. 10 within the resin plate of first end plate 19 and are collected into a single location on one side of first end plate 19, where they are brought together and extracted to the outside. As shown in FIG. 7, leads 37 are fixed to a resin sheet 38 in the form of a tape and lead to a voltage measurement unit.

Figure 11A:
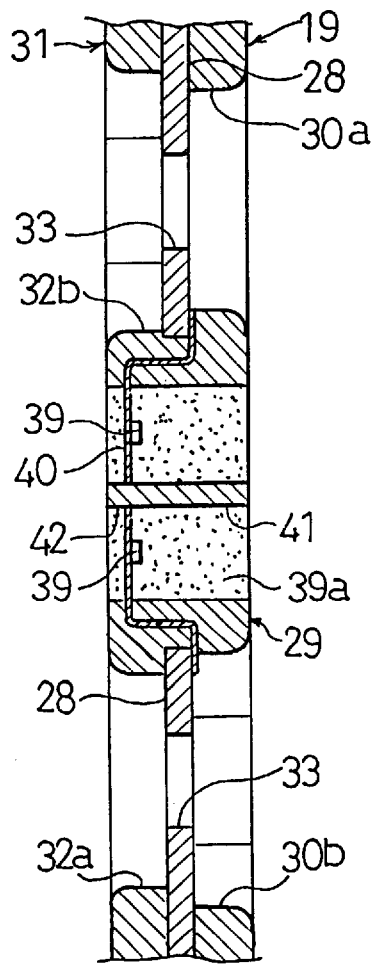
FIG. 11A is a cross-sectional view to a larger scale along the line A—A of FIG. 10
Figure 11B:
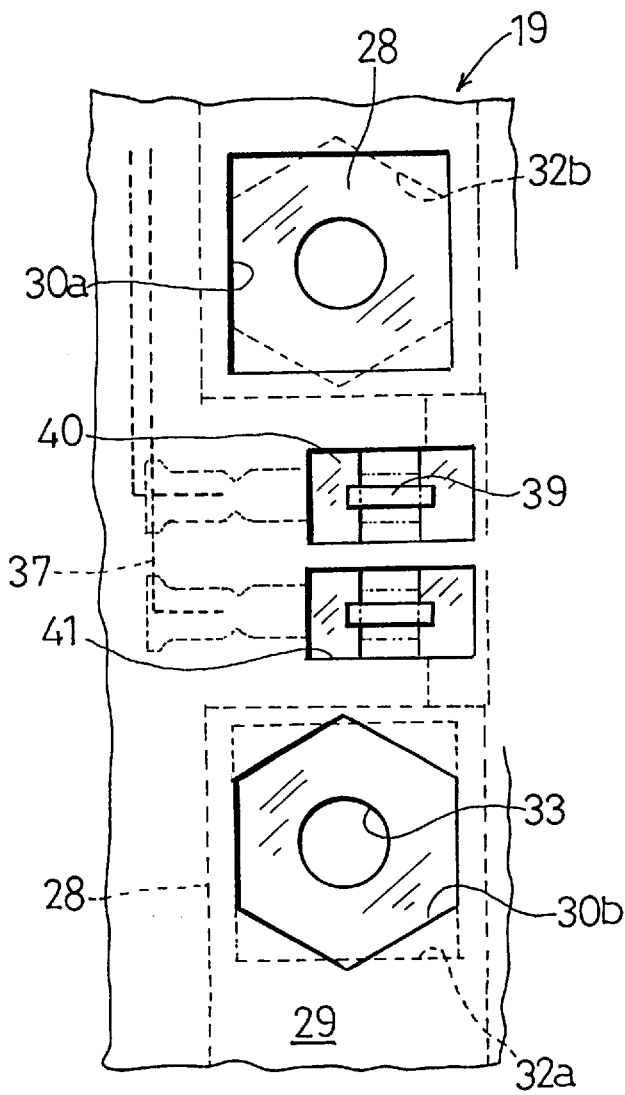
FIG. 11B is a front view thereof.

As shown in FIG. 10 and FIG. 11, excess current in leads 37 is prevented by mounting fuses 39 at the junction of leads 37 and bus bars 28. These fuses 39 are mounted by afterfixing to extensions (fuse mounting elements) 40 for lead connection provided unitarily with bus bars 28. A construction is adopted whereby the front and rear faces of the middle of extension 40 are exposed to the outside by apertures 41, 42; after producing a disconnected condition by punching through part of this extension 40 in afterprocessing, fuse 39 is mounted so as to electrically connect both sides of the disconnected portion (the disconnected portion is shown by an imaginary line in FIG. 11B). Resin molding 39a is then applied to apertures 41, 42.

The wiring of leads 37 is only provided in first end plate 19, while no wiring at all is provided in second end plate 20.

Figure 12:
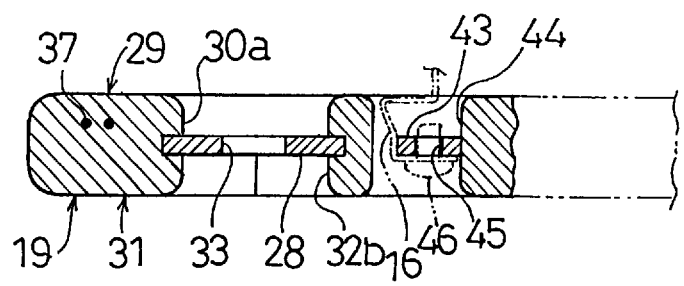
FIG. 12 is a cross-sectional view to a larger scale along the line B—B of FIG. 10.

As shown in FIG. 7, FIG. 10 and FIG. 12, a holding element 43 for connecting terminal element 16 of connecting wire 15 whereby six of the aforesaid PTC sensors 14 are connected in series is fixed to the resin plate by insertion molding in first end plate 19.

Holding element 43 is provided with a screw hole 45 exposed at a through-hole aperture 44 provided in first end plate 19. Then, after inserting terminal element 16 into through-hole aperture 44, it is bent and, next, using a screw 46, as shown in FIG. 12, terminal element 16 is electrically and mechanically connected to holding element 43. Holding element 43 is provided at both ends with two screw holes 45, 45 and acts as a bus bar effecting electrical connection of terminal elements 16, 16 of adjacent connecting wires 15. However, a holding element indicated by P in FIG. 10 and FIG. 16 has only a single screw hole 45 and acts solely as the minus terminal.

A holding element 43 as described above is also fixed in second end plate 20 in the resin plate by insert forming as shown in FIG. 13. The holding element 43 of this second end plate 20 is also provided with two screw holes 45, 45 and acts as a bus bar. However, the holding element indicated by Q in FIG. 13 and FIG. 16 has only a single screw hole 45 and serves solely as a plus terminal.

Figure 16:
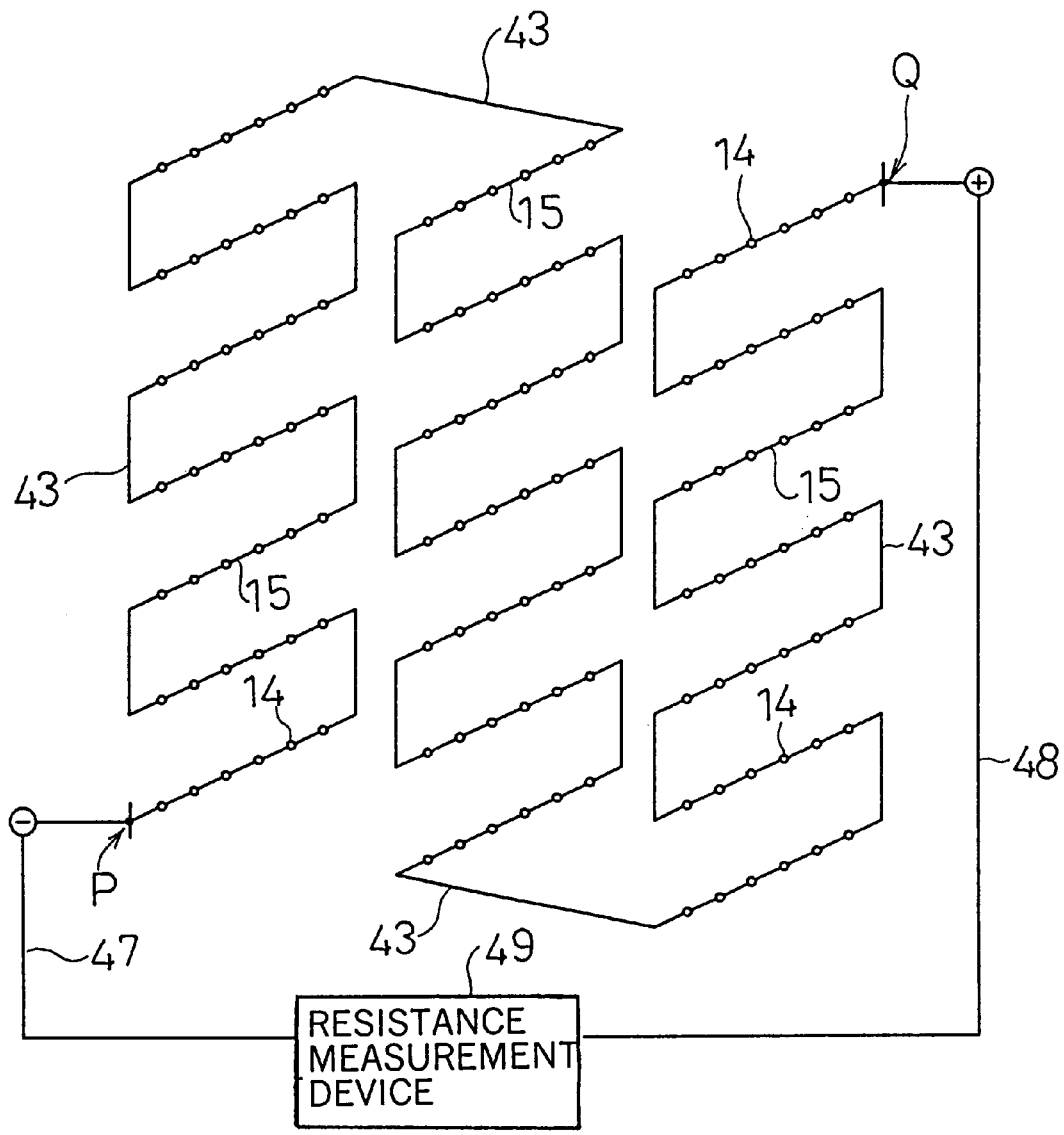
FIG. 16 is a diagram showing how a PTC sensor is connected.

FIG. 16 shows a condition in which PTC sensors 14 connected to all 126 single cells 7 that are provided in battery power source device 6 are connected electrically in series by means of holding elements 43 of first end plate 19 and second end plate 20. Since this is the same as the case where battery modules 9 shown in FIG. 15 are connected electrically in series using bus bars 28, a detailed description is omitted.

Respective external lead-out wires 47, 48 are connected (see FIG. 3) to holding element 43 constituting the minus terminal and indicated by P and to holding element 43 constituting the plus terminal and indicated by Q and are connected to a resistance measurement device 49. As a result of the enormous increase in resistance of PTC sensor 14 connected to a single cell 7 when there is an abnormal rise in temperature in one of the aforementioned 126 single cells 7, this abnormality can be detected by resistance measurement device 49. Consequently, by means of a straightforward construction in which the number of external lead-out wires 47, 48 is a minimum of two, it is possible to detect abnormal rise in temperature of all the single cells 7 of battery power source 6. A like arrangement is provided in the other battery power source device 6 constituting battery power source assembly 8.

As shown in FIG. 3, FIG. 7, FIG. 8 and FIG. 9, both ends of 21 battery modules 9 are fixed and supported in the first end plate 19 and second end plate 20 in the holder casing 10 of battery power source device 6. Also, battery modules 9 are supported in insertion holes 25a of the partitions 25, 25 by means of anti-vibration rings 51, 51 at two locations at positions about ⅓ of their lengths respectively from both ends in their longitudinal directions. These anti-vibration rings 51 are integrally formed on anti-vibration rubber sheet 22 in such a way that they project from its front surface. Anti-vibration rubber sheet 22, which is provided with 21 anti-vibration rings 51 is mounted along one face of partition 25 by pressing in all the anti-vibration rings 51 into insertion holes 25a of partition 25.

Figure 17:
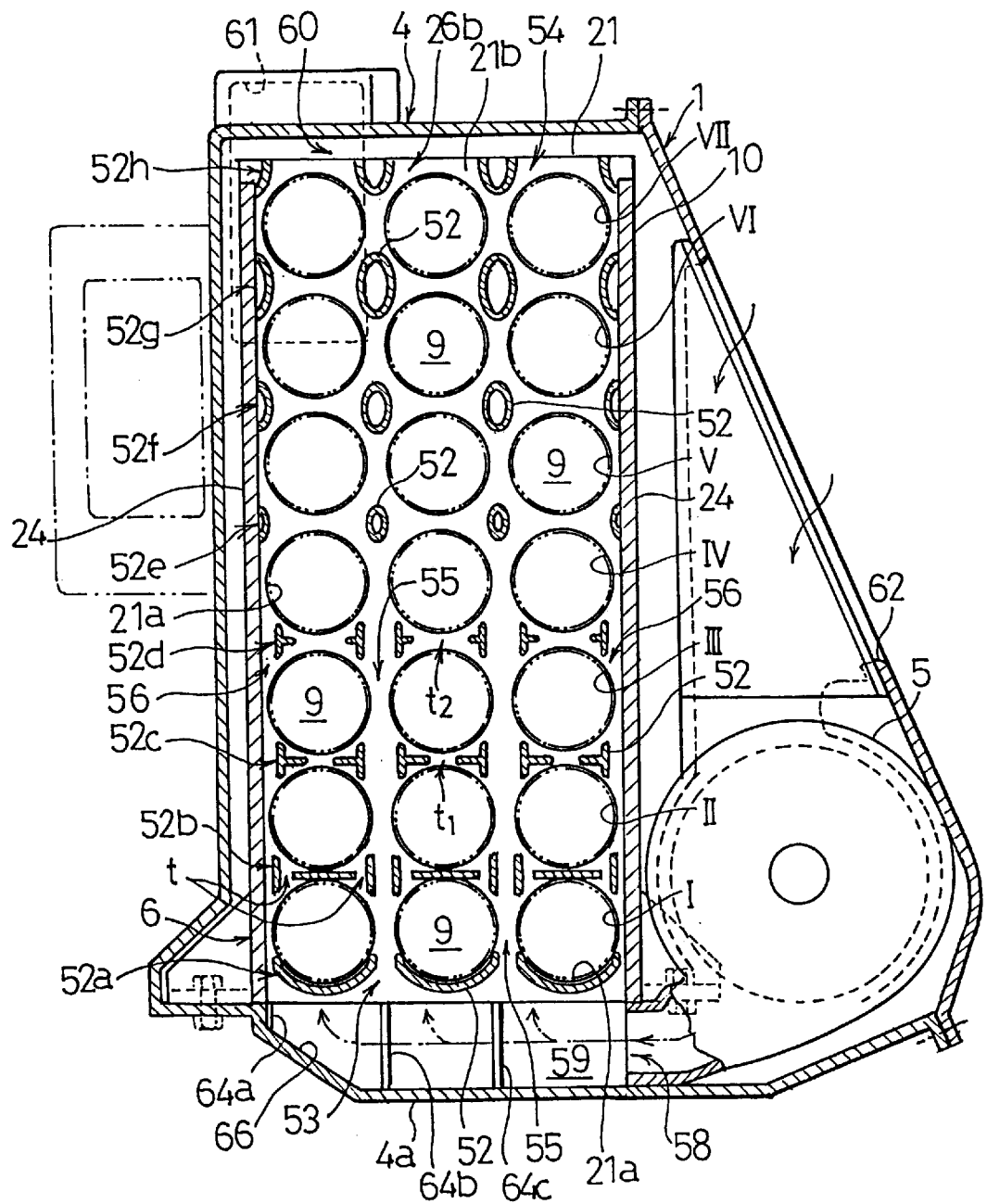
FIG. 17 is a cross-sectional view of a battery pack unit.

As already described, holder casing 10 is partitioned into three spaces by means of two partitions 25, 25. Specifically, in order from the second end plate 20 to the first end plate 19, these are first partitioned space 26a, second partitioned space 26b, and third partitioned space 26c. In the middle of each partitioned space 26a, 26b, 26c, a cooling adjustment fin plate 21 is inserted from above and fixed to main casing body 18. FIG. 8 and FIG. 17 show the relationship of cooling adjustment fins 52 (including first stage fin 52a, second stage fin 52b, third stage fin 52c, fourth stage fin 52d, fifth stage fin 52e, sixth stage fin 52f, seventh stage fin 52g, and eighth stage fin 52h) that are formed on cooling adjustment fin plate 21 and battery modules 9 that are freely inserted in insertion holes 21a of cooling adjustment fin plate 21. As is well known, means are required in battery power source device 6 for cooling the batteries in order to prevent abnormal rise in temperature produced by evolution of heat by the batteries. In this embodiment, the lower aperture of holder casing 10 constitutes an air introduction section 53 while its upper aperture constitutes an air extraction section 54. Cooling of the battery modules 9, which are arranged horizontally in seven vertical rows and three transverse rows is performed by means of an air current flowing from the bottom (upstream side) to the top (downstream side).

The cooling structure of battery modules 9 will be described taking as an example second partitioned space 26b which is located in the middle. As shown in FIG. 7 and FIG. 8, cooling adjustment fins 52 project in both directions from the main plate body 21 of cooling adjustment fin plate 21 and extend to a position adjacent partitions 25, 25 so as to adjust the direction of flow and the flow rate of the air current. As shown in FIG. 17, a first stage fin 52a is provided that is arcuate in cross-section about the bottom side of three respective insertion holes 21a I (the seven insertion holes from the first stage to the seventh stage are respectively indicated by I~VII in FIG. 17) of the lowest stage (also called the first stage), as shown in FIG. 17, so as to severely reduce the ratio of the amount of air directly incident on to first-stage battery module 9.

A second-stage fin 52b, third stage fin 52c, and fourth stage fin 52d of flat H-shape with an interruption section in cross-section are provided in vertically intermediate positions between corresponding insertion holes in, respectively, first stage three insertion holes I and the second stage three insertion holes II thereabove, second stage three insertion holes II and the third stage three insertion holes III thereabove, and third stage three insertion holes III and the fourth stage three insertion holes IV thereabove. Second stage fin 52*b* is formed with interrupting sections t, t on both sides of the portion of H-shaped cross-section; third stage fin 52*c* is formed with an interrupting portion $t_1$ in the middle of the portion of H-shaped cross-section; and fourth stage fin 52*d* is formed with an interrupting portion $t_2$ of greater width in the middle of the portion of H-shaped cross-section. In this way, the ratio of air directly striking second stage battery module 9 is increased from that in the case of first stage battery module 9; the ratio of air directly striking third stage battery module 9 is increased from that of second stage battery module 9; and the ratio of air directly striking fourth battery module 9 is increased from that of third stage battery module 9.

Between the three insertion holes IV of the fourth stage and the three insertion holes V of the fifth stage on top of these, there are provided fifth stage fins 52*e* consisting of four fins arranged next to each other transversely and consisting of two fins of vertically elongate elliptical cross-sectional shape (those shown in FIG. 17 are hollow in cross-section in order to reduce weight, but fins which are not hollow could be employed) and two fins of vertically elongate semi-elliptical cross-section (which could be hollow or not). The two fins of vertically elongate elliptical cross-section that are positioned in the middle are arranged at the center-points of the four insertion holes IV, IV, V, V in the vertical and horizontal directions of their respective peripheries, while the two fins of vertically elongate semi-elliptical cross-section that are positioned at both ends are located on the outside vertically in the middle of corresponding vertical insertion apertures IV and V, so as to make contact with the side edge of main plate and body section 21*b*. Between the three insertion holes V of the fifth stage and the three insertion holes VI of the sixth stage on top of these and between the three insertion holes VI of the sixth stage and the three insertion holes VII of the seventh stage on top of these, there are provided six stage fins 52*f* and seven stage fins 52*g* consisting of four fins in the same relative positions and of practically the same shape as fins 52*e* of the fifth stage. Further, in positions above the three insertion holes VII of the uppermost stage (which may also be called the seventh stage), there are provided eighth stage fins 52*h* consisting of four fins in the same positional relationship as seventh stage fins 52*g*, being fins of a shape wherein the upper half of the fins of seventh stage fins 52*g* is omitted. The cross-sectional area of the fins of sixth stage fins 52*f* is larger than the cross-sectional area of the fins of fifth stage fins 52*e* and the cross-sectional areas of the fins of seventh stage fins 52*g* is larger than the cross-sectional area of the fins of sixth stage fins 52*f*. By thus making the cross-sectional areas of cooling adjustment fins 52*e*, 52*f*, 52*g* larger as one goes upwards, the flow path of the air current formed between battery module 9 and cooling adjustment fins 52 is throttled as one goes further in the upwards direction, so that the flow rate of air flowing through the peripheral region of battery module 9 of the fifth stage is larger than the flow rate of air flowing through the peripheral region of battery module 9 of the fourth stage, the flow rate of air flowing through the peripheral region of sixth stage battery module 9 is increased from the flow rate of air flowing through the peripheral region of the battery module 9 of the fifth stage, and the flow rate of air flowing through the peripheral region of the seventh stage battery module is greater than the flow rate of air flowing through the peripheral region of battery module 9 of the sixth stage. This utilizes the fact that, when the flow rate of an air current increases, its cooling effect increases in proportion to the square root.

The air cooling structure of battery modules 9 was described above taking as example the case of second partitioned space 26*b*; however, the air cooling structure in the other, namely, the first partitioned space 26*a* and third partitioned space 26*c* is constructed in the same way. In each case, of the large number of battery modules 9 arranged in multiple stages in parallel in a direction at right angles to the air current flowing upwards from below, regarding the battery modules 9 belonging to the lower-stage side groups (in the case shown in FIG. 17, those arranged in stages 1 to 4) the bottom sides of battery modules 9 are covered by screening fins 52*a*~52*d* that adjust the quantity of air that is directly incident on battery modules 9 and the quantity of air striking battery modules 9 is arranged to progressively increase as one goes from the lowest stage (stage 1) to the upper stages (second stage, third stage, fourth stage). In this way, over-cooling of battery modules 9 in the lowest stage is prevented and the amount of air striking battery modules 9 is increased going towards the upper stages so as to compensate for the lowering in cooling effect of the air produced by the gradual rise in temperature due to the heat evolved by the batteries. Cooling of battery modules 9 of each stage (stage 1~stage 4) can be thus arranged to be performed practically evenly.

As shown in FIG. 17, most of the air that cools the battery modules 9 belonging to the lower group rises through passages 55, 55 formed between the left and right battery modules 9 and the passages 56, 56 formed between battery modules 9 and side wall 24. Some of it is extracted to battery modules 9 and is then again merged with passages 55, 56, reaching the underside of fifth-stage battery modules 9. Next, the air current is employed to cool battery modules 9 belonging to the upper-stage group (in the case shown in FIG. 17, those modules which are arranged in the fifth to seventh stages); however, since it has already cooled the battery modules 9 of the four stages belonging to the lower group, the air temperature is fairly high, so the cooling effect is lowered. In order to compensate for this, for cooling of the battery modules 9 belonging to the upper-stage group, the air current is throttled, so as to raise the flow speed of the air current around battery modules 9. Above passages 55, 55, 56, 56, there are arranged flow-path throttling type fins 52*e*~52*h* in order to raise the flow speed of the air current by narrowing the gaps between battery modules 9, being arranged diagonally below battery modules 9 of the fifth, sixth and seventh stages and diagonally above battery modules 9 of the seventh stage. Also, these gaps are made progressively narrower going towards the upper stages (fifth stage, sixth stage and seventh stage) to raise the flow rate of the air current around battery modules 9 so as to compensate for the loss of cooling effect of the air as it is gradually heated up as it rises: thus practically uniform cooling of the battery modules 9 in each stage (fifth stage~seventh stage) can be achieved.

In this way, a construction is obtained in which all the battery modules 9 are cooled practically uniformly from the lowest stage to the highest stage. It should be noted that although, in this embodiment, a construction was adopted in which practically uniform cooling of all the battery modules 9 was achieved by using screening fins 52*a*~52*d* for the lower four stage battery modules 9 and flow-path throttling fins 52*e*~52*h* for the upper three stage battery modules 9, adjustment of the air flow etc. would of course be possible by for example using screening fins for the lower three stage battery modules 9, providing no fins corresponding to the battery modules 9 in the fourth, intermediate stage, and employing flow path throttling fins for battery modules 9 in the upper three stages.

Figure 18:
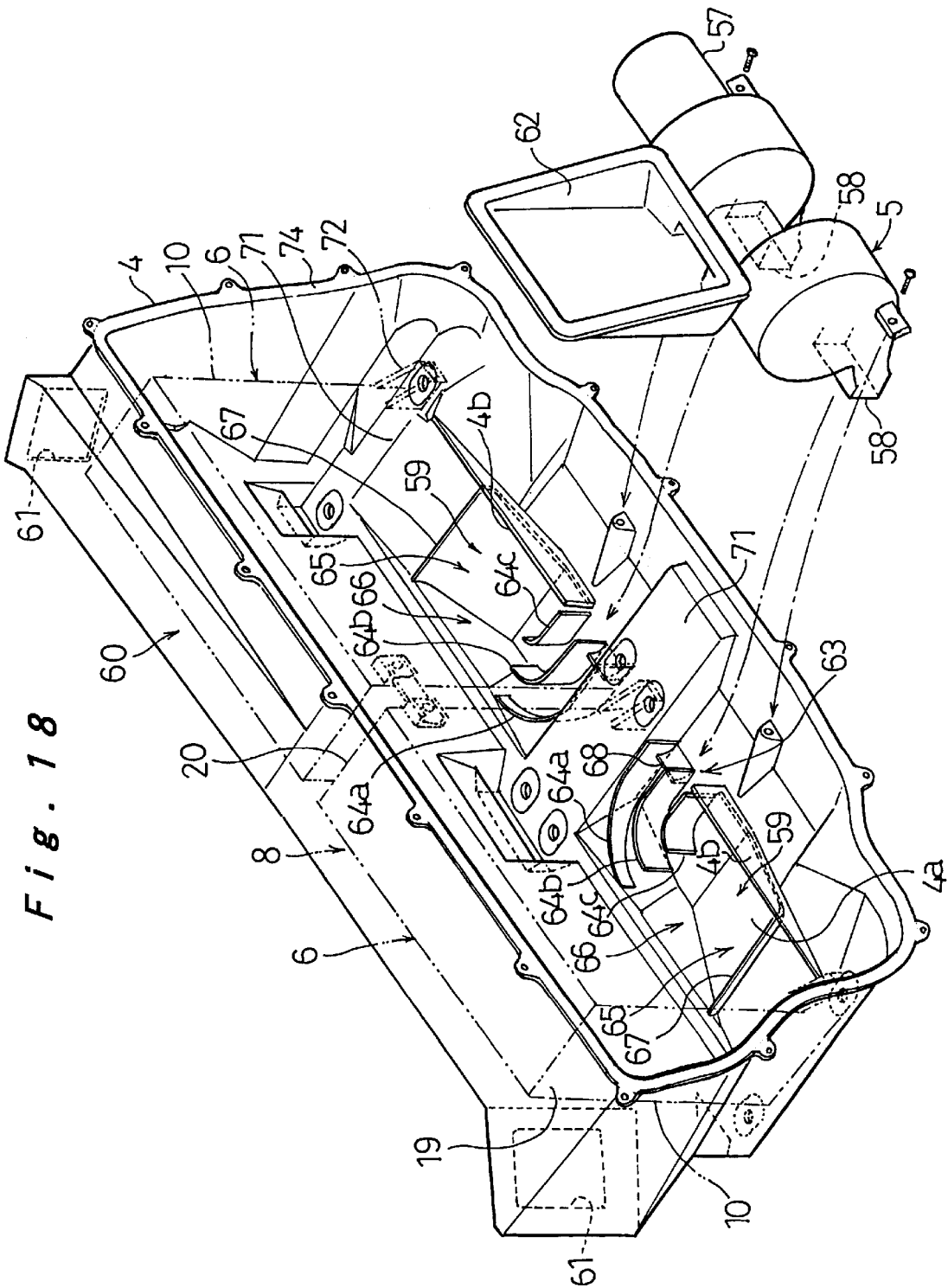
FIG. 18 is an exploded perspective view of a battery pack unit.

Since the batteries used in this embodiment are nickel-hydrogen secondary cells, it is necessary to devise safety measures in respect of hydrogen leakage in the event of abnormality from the battery cans. The air is fed into battery power source device 6 by pressure feed by a fan 5 equipped with a sirocco fan. However, it is in particular vital to give consideration to ensuring that hydrogen cannot be fed into the vicinity of fan 5 and the interior of motor 57 that drives this and/or their vicinity. Accordingly, in this embodiment, as shown in FIG. 8, FIG. 17 and FIG. 18, fan 5 and motor 57 are arranged to the side and underneath holder casing 10 and fan aperture 58 is arranged below holder casing 10, so that air that is pressure-fed from fan 5 passes through air supply chamber 59 formed below outer casing 4, and reaches air introduction section 53 at the bottom end of holder casing 10, and then cools battery modules 9 by flowing through holder casing 10 from the bottom to the top, then issues from air extraction section 54 of holder casing 10, after which it passes through air discharge chamber 60 formed above outer casing 4 and is discharged to the outside of outer casing 4 from a discharge port 61 formed in the upper side end of outer casing 4. By the adoption of this construction, even if hydrogen should escape from battery modules 9 within holder casing 10, delivery of hydrogen to fan 5 can be prevented.

FIG. 18 shows a construction in which cooling air is pressure-fed to left and right battery power source devices 6, 6 by a single fan 5. Fan 5 is equipped with a pair of left and right sirocco fans and fan apertures 58, 58; it extracts air within the vehicle from air extraction port 62 and feeds air uniformly from the pair of fan apertures 58, 58 into left and right air supply chambers 59, 59.

Air supply chambers 59 are constituted by a space enclosed by a bottom sheet part 4a of outer casing 4, the front wall 4b that stands erect in a front position in FIG. 18 of bottom sheet 4a, and the bottom face of holder casing 10. At an inlet 63 facing fan aperture 58, there are provided a plurality of curved flow alignment guides 64a, 64b, 64c erected on bottom sheet 4a for guiding air from fan aperture 58 inwards and sideways. Inlet 63 is arranged in the middle in the width direction of outer casing 4, being arranged so as to be positioned below first partitioned space 26a of holder casing 10. Bottom sheet 4a is formed so that, within air supply chamber 59, it has a slope 65 going gradually upwards towards the outside i.e. towards second partitioned space 26b and third partitioned space 26c, and has a slope 66 going gradually upwards towards the inside. An air current direction guide 67 of small height that leads the air upwards is provided at a position on slope 65 below the boundary of second partitioned space 26b and third partitioned space 26c (see FIG. 8).

The air that is extracted from inlet 63 is fed through two air passages formed in each space between the three flow alignment guides 64a, 64b and 64c into the inside and into second and third partitioned spaces 26b, 26c, while part of it is fed into first partitioned space 26a. In order to prevent that this air current goes straight through the air passage and there is insufficiency of the amount of air fed into first partitioned space 26a, there is provided an air current direction guide 68 that directs the air upwards in the vicinity of the inlet to the air passage nearest second end plate 20. Of the air that issues from the two air passages, some is fed into second partitioned space 26b while the remainder is fed to underneath the third partitioned space 26c. Air current direction guide 67 is provided in order to ensure that there is no insufficiency in the amount of air that is fed into second partitioned space 26b at this point. The air that is led to below third partitioned space 26c is then led into third partitioned space 26c.

Thus, by providing flow alignment guides 64a, 64b, 64c and air current direction guides 67, 68, and slopes 65, 66, the amount of air that is introduced into partitioned spaces 26a, 26b, 26c is made practically uniform and the possibility of the amount of air drawn in at the front and the inside in each partitioned space being non-uniform is avoided. It should be noted that, since the two single cells 7 arranged within the second partitioned space 26b are in the center position of battery module 9, it is necessary to apply more cooling to them by means of the air current than in comparison with the single cells 7 arranged in first and third partitioned spaces 26a, 26c, owing to the effect of evolution of heat from these single cells 7 arranged in first and third partitioned spaces 26a, 26c.

It is therefore desirable to design air current direction guide 67 such as to make the amount of air that is directed into second partitioned space 26b rather larger than the amount of air that is directed into the other partitioned spaces 26a, 26c.

As shown in FIG. 18 and FIG. 8, outer casing 4 is provided with a holder casing mounting seat 71 on its bottom sheet 4a and the left and right holder casings 10, 10 are mounted and fixed in a foot portion 72 thereof by means of bolts and nuts 73. Also, a flange 74 is provided mounted on the main automobile body at the periphery of outer casing 4.

In the above embodiment, as shown in FIG. 15, all the battery modules 9 in battery power source device 6 are constantly connected electrically in series. However, for purposes of safety during repair work etc. it is convenient to provide a safety plug 75 in order to cut off temporarily this series connection. For this purpose, as shown by the imaginary line in FIG. 15, a bypass may be provided whereby the locations indicated by 17a and 17b and an openable safety plug 75 are connected by leads 76, 77 by for example severing S17 bus bars 28 at a location indicted by N in subsequent processing, after exposing these at an aperture provided in first end plate 19.

With the present invention, the support strength and rigidity of the battery modules can be enormously improved and a battery power source device and end plates for use therein can be provided whereby the battery modules can be assembled in the holder casing in a simple manner and without any possibility of their being wrongly inserted.

Also with the present invention, the problem of occurrence of twisting between the single cells constituting the battery modules on locking the battery modules to the bus bars can be solved and the benefit can be obtained that voltage detection of the battery modules and/or detection of abnormal rise in temperature of the single cells can be achieved efficiently by means of a straightforward construction.

Furthermore, with the present invention, uniform cooling can be performed of the battery modules which are arranged parallel to each other in large numbers in the holder casing, and cooling that is uniform as between the single cells constituting the battery modules can also be achieved.

In particular, with the present invention, the problem that the cooling effect of the cooling air is lowered because of its increased temperature on the downstream side compared with the upstream side is solved, thereby making it possible to effect uniform cooling of the battery modules whether they are on the upstream side or downstream side. Furthermore, efficient utilization of the air current can be achieved by preventing over-cooling of the battery modules on the upstream side.

Furthermore, with the present invention, cooling of a battery power source employing nickel-hydrogen secondary cells can be performed whilst maintaining safety in regard to hydrogen.

Moreover, cooling of a battery power source assembly comprising a pair of battery power source devices can be performed in a uniform manner for all the battery modules by using only a single pressure-feed fan.

While preferred embodiments of the invention have been described using specific terms, such description is for illustrative purposes only, and it is to be understood that changes and variations may be made without departing from the spirit or scope of the following claims.

What is claimed is:

1. A battery power source device characterized in that a large number of battery modules consisting of a row of a plurality of single cells connected electrically and mechanically in series are arranged parallel to each other and held in a holder casing, bus bars being provided that effect electrical connection between the terminals of battery modules at respective end plates positioned at both ends of said holder casing wherein the end plates are constituted of resin plates and the bus bars are fixed to the end plates by insertion molding.

2. The battery power source device according to claim 1 wherein all of the battery modules that are arranged in said holder casing are, as a whole, electrically connected in series by being alternately connected by a bus bar of one end plate and a bus bar of the other end plate.

3. The battery power source device according to claim 2 wherein the battery modules are held in said holder casing arranged horizontally in matrix fashion on respective vertical and transverse straight lines.

4. The battery power source device according to claim 1 wherein leads for measuring the voltages across the terminals of single ones or a plurality of battery modules are embedded by insertion molding in an end plate.

5. The battery power source device according to claim 1 wherein temperature sensors whose electrical resistance increases abruptly on rise in temperature of the single cells are mounted from outside, these temperature sensors being connected in series, whereby abnormal rise in temperature is detected in at least battery module units.

6. The battery power source device according to claim 5 wherein holding elements that hold the ends of connecting wires that connect the temperature sensors in series are fixed in an end plate by insertion molding.

7. The battery power source device according to claim 6 wherein abnormality of temperature rise is detected in units of a plurality of battery modules by providing connecting wires at units of battery modules and electrically connecting in series holding elements that hold the ends of these.

8. The battery power source device according to claim 7 wherein connecting elements that effect series electrical connection between holding elements are fixed to an end plate by insertion molding.

9. The battery power source device according to claim 8 wherein abnormality of temperature rise is detected by mounting from the outside temperature sensors whose electrical resistance increases abruptly on rise in temperature on all the single cells arranged in the holder casing, all these temperature sensors being connected in series.

10. The battery power source device according to claim 1 wherein said single cells are nickel-hydrogen secondary cells.

11. The battery power source device according to claim 1, wherein the bus bars are embedded in and integral with the end plates.

12. A battery power source device characterized in that a large number of battery modules, each consisting of a row of a plurality of single cells connected electrically and mechanically in series, are arranged parallel to each other and held in a holder casing, bus bars being provided that effect electrical connection between the terminals of battery modules at respective end plates positioned at both ends of said holder casing wherein the end plates are constitutes of resin plates and the bus bars are fixed to the end plates by insertion molding, leads are connected to the battery modules for measuring voltage across the terminals, fuse mounting elements are molded into one of the end plates for receiving fuses, the leads are embedded in and connected to the fuse mounting elements and the respective leads are collected at a single location on the end plate and extend outside of the end plate to enable an electrical connection of the leads.

13. The battery power source device according to claim 6 constructed so as to be capable of measurement of the voltage across the terminals of two battery modules wherein, of the two end plates, the leads are embedded by insertion molding in only one end plate, each lead being connected to each bus bar.

14. A cooling device for a battery power source in which a large number of battery modules are constituted by connecting a plurality of single cells in a row electrically and mechanically in series are arranged parallel to each other and held in a holder casing comprising; means for forcibly making air to flow in one direction within said holder casing thereby cooling the large number of battery modules in said holder casing wherein the direction of flow of the air is a direction at right angles to the longitudinal direction of said battery modules and means for flow alignment are arranged within said holder casing such that a flow speed of the air flowing through said holder casing is faster on the downstream side than on the upstream side.

15. The cooling device for a battery power source according to claim 14 in which, at a location on the downstream side in said holder casing, the flow path area is progressively diminished such that the flow speed of air flowing through said holder casing gradually becomes larger in the direction of flow of the air.

16. A cooling device for a battery power source in which a large number of battery modules constituted by connecting a plurality of single cells in a row electrically and mechanically in series are arranged parallel to each other and held in a holder casing and air is forcibly made to flow in one direction within said holder casing thereby cooling the large number of battery modules in said holder casing wherein the direction of flow of the air is at a direction at right angles to the longitudinal direction of said battery modules and means for screening are arranged in said holder casing such that the area of said battery modules that is exposed to the air flowing through said holder casing becomes greater from the upstream to the downstream side.

17. The cooling device for a battery power source according to claim 16 in which means for screening are arranged only at a location on the upstream side within said holder casing, the means for screening being constituted such that the area of said battery modules that is exposed to air flowing through said holder casing gradually becomes larger going in the direction in which the air is flowing.

18. A cooling device for a battery power source comprising a pair of left and right battery power source devices constituted by holding a large number of battery modules consisting of a plurality of single cells connected in a row electrically and mechanically in series arranged horizontally and parallel to each other in a holder casing, respective air supply chambers being formed below said holder casings and wherein air is fed to a lower aperture of the holder casing of the respective battery power source devices through left and right air supply chambers from a pressure-feed fan so that the battery module is cooled by the air current that is discharged from an upper aperture after rising through said holder casings wherein the pressure-feed fan has two blowing ports that supply air in a direction parallel to the surfaces of the end plates into said respective battery power source devices, these blowing ports open in positions close to a respective one end plate of the battery power source devices, the bottom faces of the air supply chambers being formed with a slope whereby the cross-sectional area of the flow path gradually diminishes from the one end plate side towards the other end plate side and means for flow alignment are arranged within said holder casing whereby the flow rate of the air flowing within said holder casing is faster at the upper than at the lower side of said holder casing.

19. The cooling device for a battery power source according to claim 18 wherein the flow path area is gradually diminished at a location in the upper part in said holder casing such that the flow speed of air flowing in said holding casing gradually gets larger in the direction in which the air is flowing.

20. A cooling device for a battery power source comprising a pair of left and right battery power source devices constituted by holding a large number of battery modules consisting of a plurality of single cells connected in a row electrically and mechanically in series arranged horizontally and parallel to each other in a holder casing, respective air supply chambers being formed below said holder casinos and wherein air is fed to a lower aperture of the holder casing of the respective battery power source devices through left and right air supply chambers from a pressure-feed fan so that the battery module is cooled by the air current that is discharged from an upper aperture after rising through said holder casings wherein the pressure-feed fan has two blowing ports that supply air in the direction parallel to the surfaces of the end plates into said respective battery power source devices, these blowing ports opening in positions close to a respective one end plate of the battery power source devices, the bottom faces of the air supply chambers being formed with a slope whereby the cross-sectional area of the flow path gradually diminishes from the one end plate side towards the other end plate side and means for screening are arranged in the holder casing whereby the area of the battery modules that is exposed to the air flowing through said holder casing is greater in an upper part of said holder casing than in a lower part.

21. The cooling device for a battery power source according to claim 20 wherein means for screening are arranged only in a location of the bottom part in said holder casing, the means for screening being constructed such that the area of the battery modules that is exposed to the air flowing through said holder casing gradually gets larger in the direction of flow of the air.

* * * * *